(12) United States Patent
Chynoweth et al.

(10) Patent No.: US 9,465,680 B1
(45) Date of Patent: Oct. 11, 2016

(54) METHOD AND APPARATUS FOR PROCESSOR PERFORMANCE MONITORING

(71) Applicant: INTEL CORPORATION, Santa Clara, CA (US)

(72) Inventors: Michael W. Chynoweth, Rio Rancho, NM (US); Jonathan D. Combs, Austin, TX (US); Angela D. Schmid, Pleasanton, CA (US); Kimberly C. Weier, Austin, TX (US); Ahmad Yasin, Haifa (IL); Jason W. Brandt, Austin, TX (US); Charlie J. Hewett, Bellevue, WA (US); Seth Abraham, Tempe, AZ (US); Matthew C. Merten, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/721,819

(22) Filed: May 26, 2015

(51) Int. Cl.
*G06F 13/00* (2006.01)
*G06F 9/54* (2006.01)
*G06F 11/34* (2006.01)
*G06F 11/30* (2006.01)

(52) U.S. Cl.
CPC ........... *G06F 9/542* (2013.01); *G06F 11/3024* (2013.01); *G06F 11/3409* (2013.01)

(58) Field of Classification Search
CPC .............................. G06F 9/3861; G06F 9/542
USPC ........................................... 712/244; 719/318
See application file for complete search history.

(56) References Cited

U.S. PATENT DOCUMENTS

| | | | |
|---|---|---|---|
| 8,615,742 B2 * | 12/2013 | Indukuru | G06F 8/4442 717/124 |
| 9,063,762 B2 | 6/2015 | Serebrin | |
| 2007/0006032 A1 | 1/2007 | Sun | |
| 2009/0276185 A1 | 11/2009 | Mericas | |
| 2010/0235836 A1 | 9/2010 | Bratanov | |
| 2012/0046912 A1 | 2/2012 | Indukuru | |
| 2012/0226477 A1 | 9/2012 | Cascaval | |
| 2013/0019248 A1 | 1/2013 | Yu | |
| 2014/0013020 A1 | 1/2014 | Horsnell | |
| 2014/0013091 A1 * | 1/2014 | Yasin | G06F 11/3466 712/244 |
| 2014/0344831 A1 | 11/2014 | Levine | |

OTHER PUBLICATIONS

Office Action from U.S. Appl. No. 14/292,140, mailed Jan. 12, 2016, 9 pages.

* cited by examiner

*Primary Examiner* — Andy Ho
(74) *Attorney, Agent, or Firm* — Nicholson De Vos Webster & Elliott LLP

(57) ABSTRACT

A processor and method are described for implementing performance monitoring using a fixed function performance counter. For example, one embodiment of an apparatus comprises: a fixed function performance counter to decrement or increment upon occurrence of an event in the processing device; a precise event based sampling (PEBS) enable control communicably coupled to the fixed function performance counter; a PEBS handler to generate and store a PEBS record comprising architectural metadata defining a state of the processing device at a time of generation of the PEBS record; and a non-precise event based sampling (NPEBS) module communicably coupled to the PEBS enable control and the PEBS handler, the NPEBS module to cause the PEBS handler to generate the PEBS record for the event upon the fixed function performance counter reaching a specified value.

24 Claims, 19 Drawing Sheets

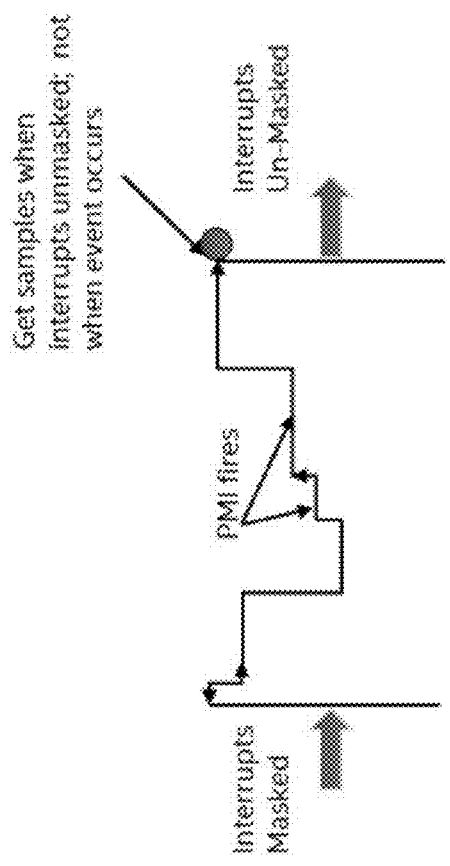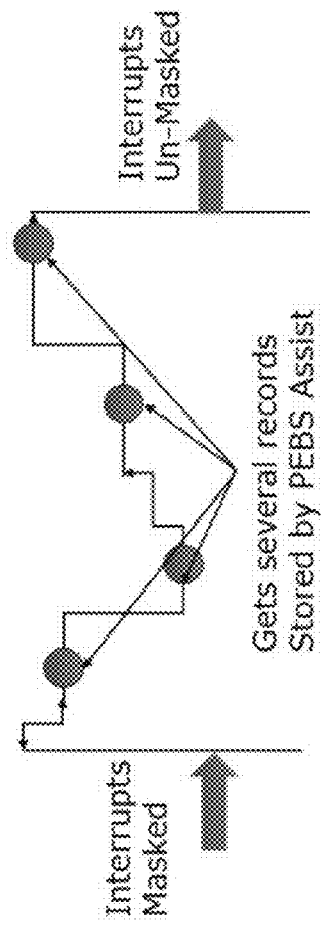
Fig. 16A
Fig. 16B

METHOD AND APPARATUS FOR PROCESSOR PERFORMANCE MONITORING

BACKGROUND

1. Field of the Invention

This invention relates generally to the field of computer processors and software. More particularly, the invention relates to an apparatus and method for processor performance monitoring.

2. Description of the Related Art

Performance analysis is the foundation for characterizing, debugging, and tuning a micro-architectural processor design, finding and fixing performance bottlenecks in hardware and software, as well as locating avoidable performance issues. As the computer industry progresses, the ability to analyze the performance of a microarchitecture and make changes to the microarchitecture based on that analysis becomes more complex and important.

BRIEF DESCRIPTION OF THE DRAWINGS

A better understanding of the present invention can be obtained from the following detailed description in conjunction with the following drawings, in which:

FIGS. 16A-B illustrate improvements to performance monitoring realized by embodiments of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
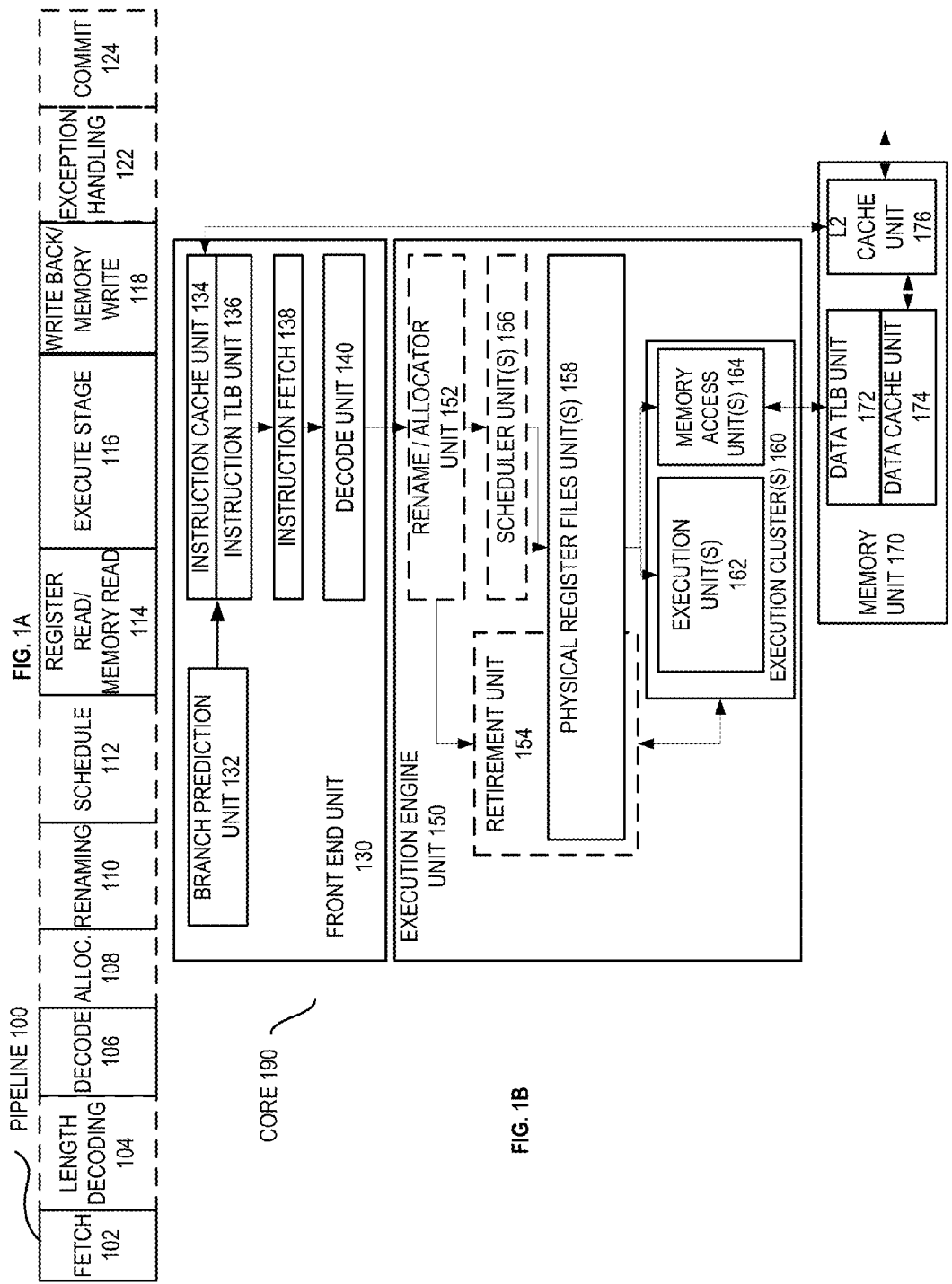
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
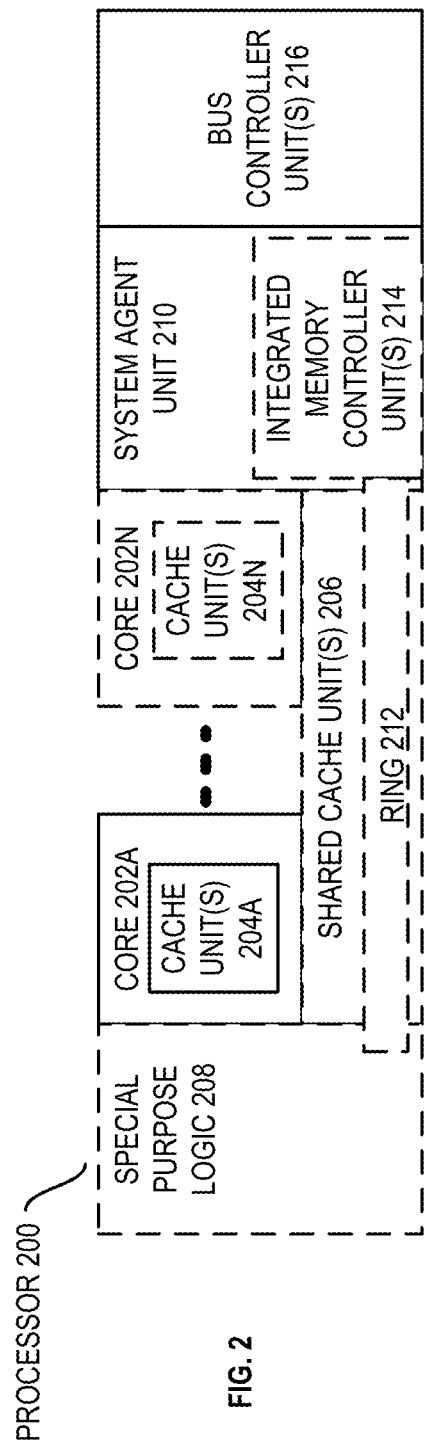
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
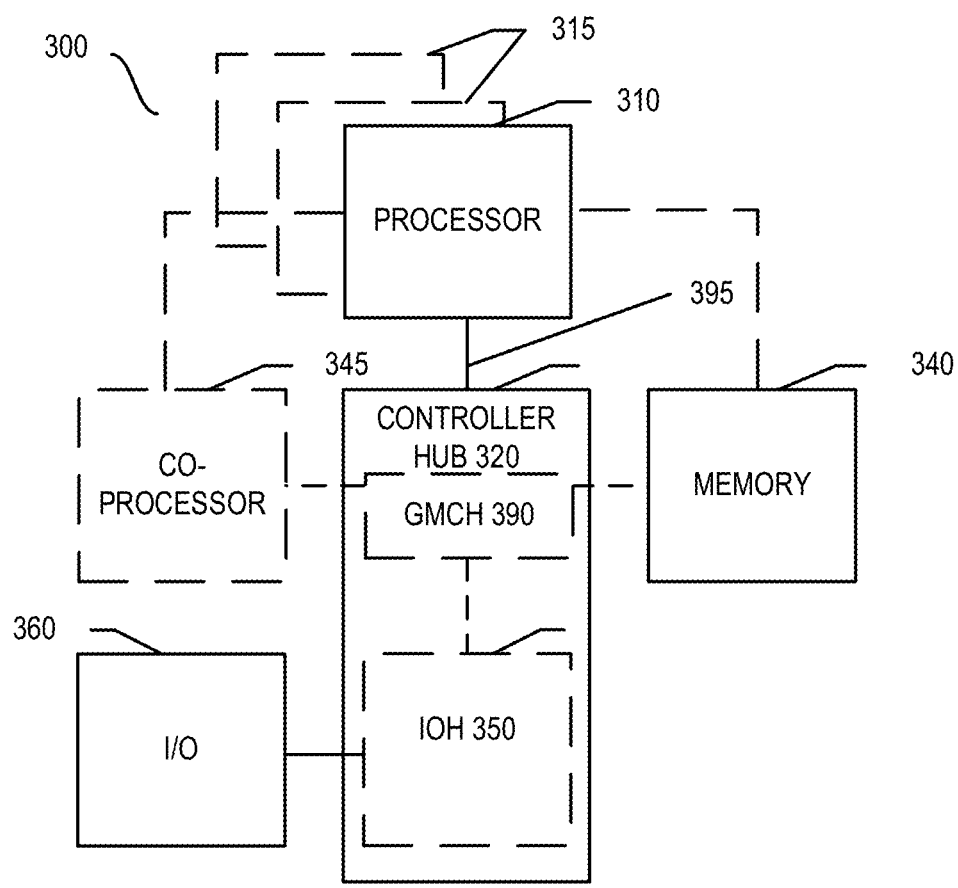
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
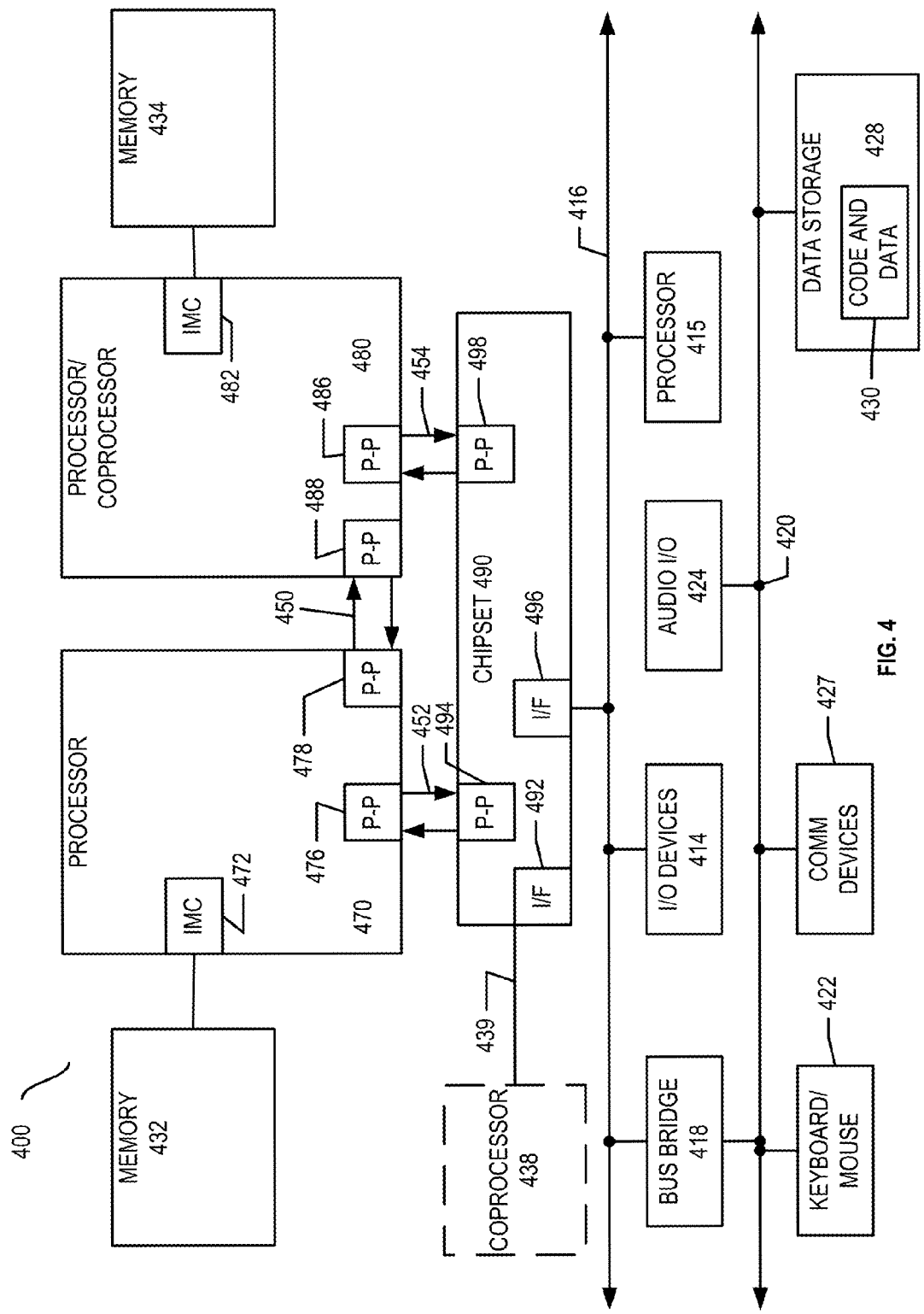
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488.

Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
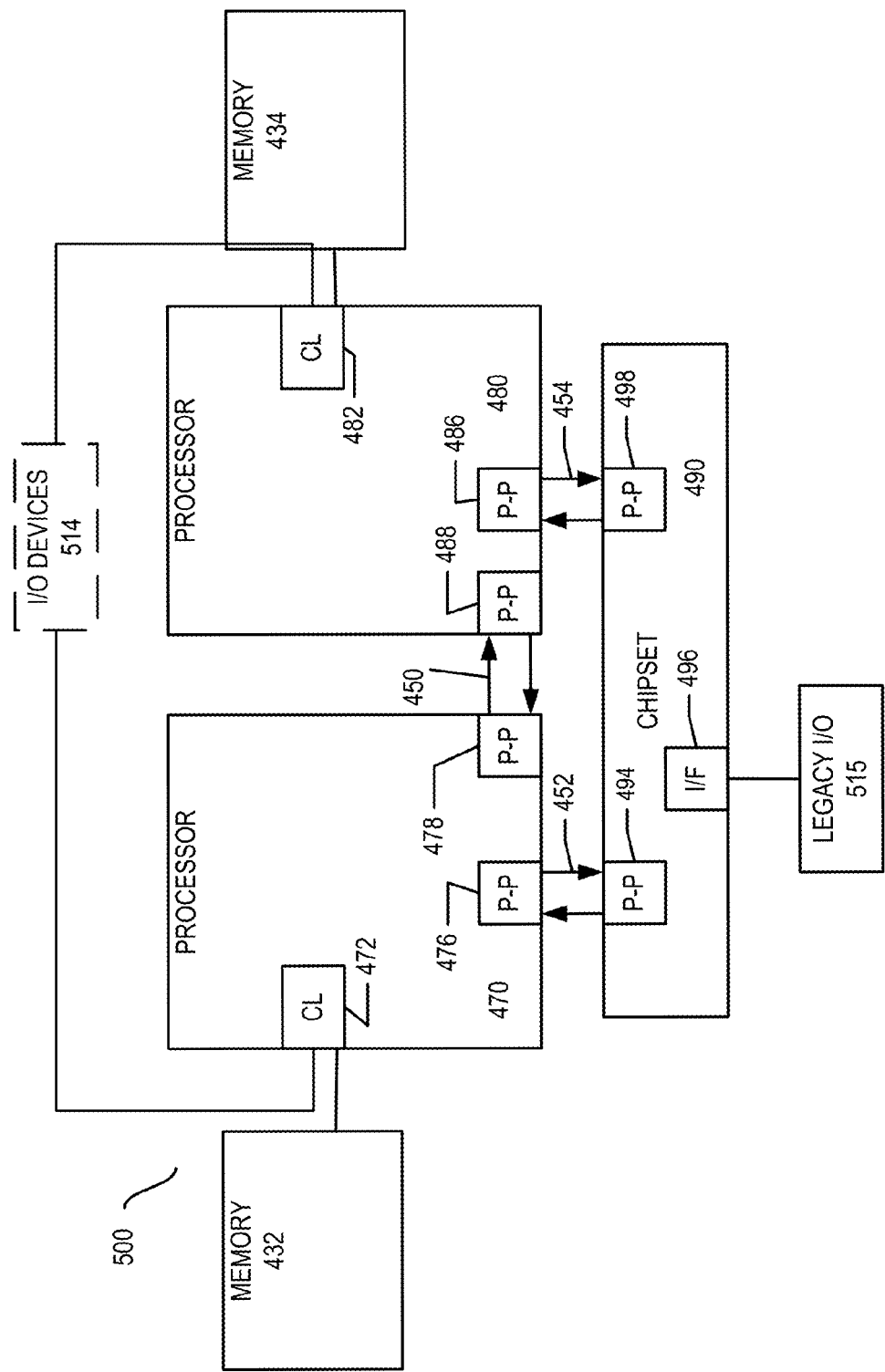
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
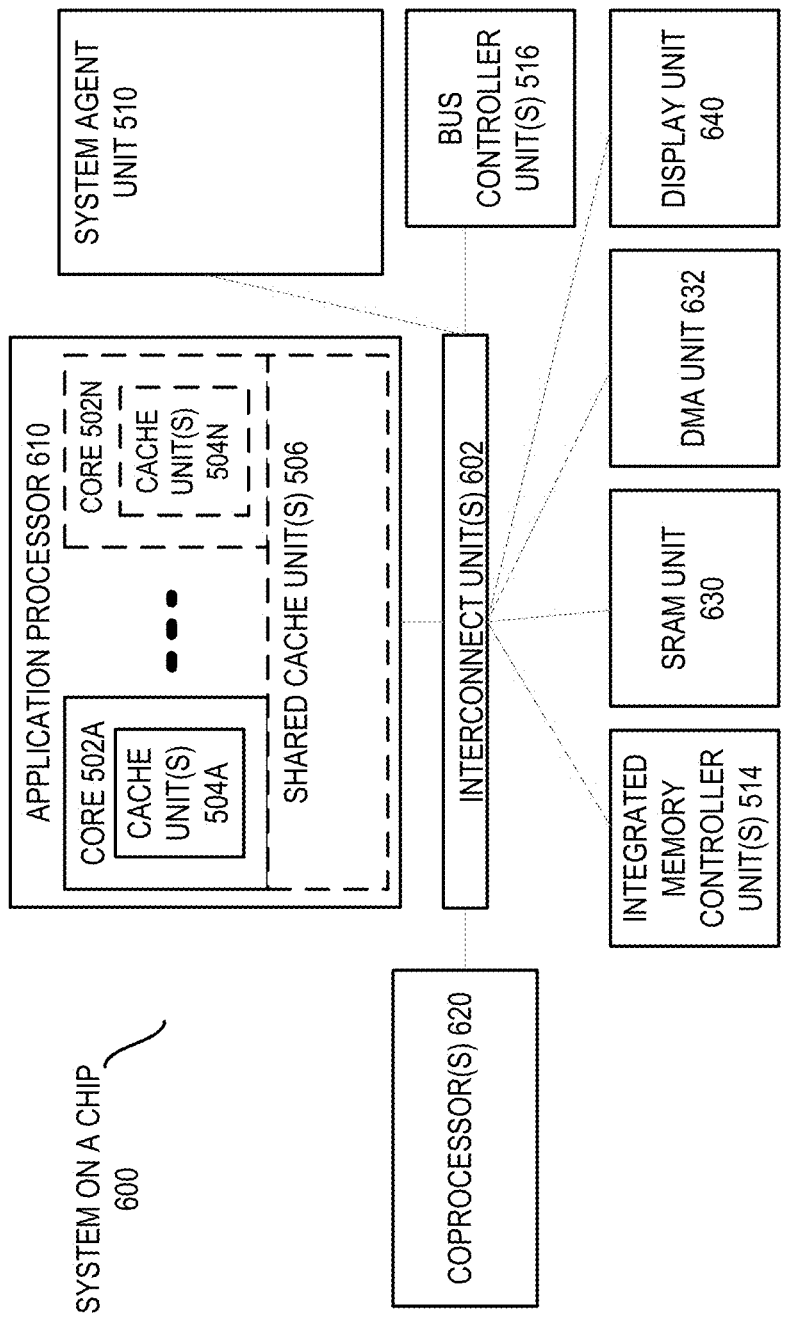
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
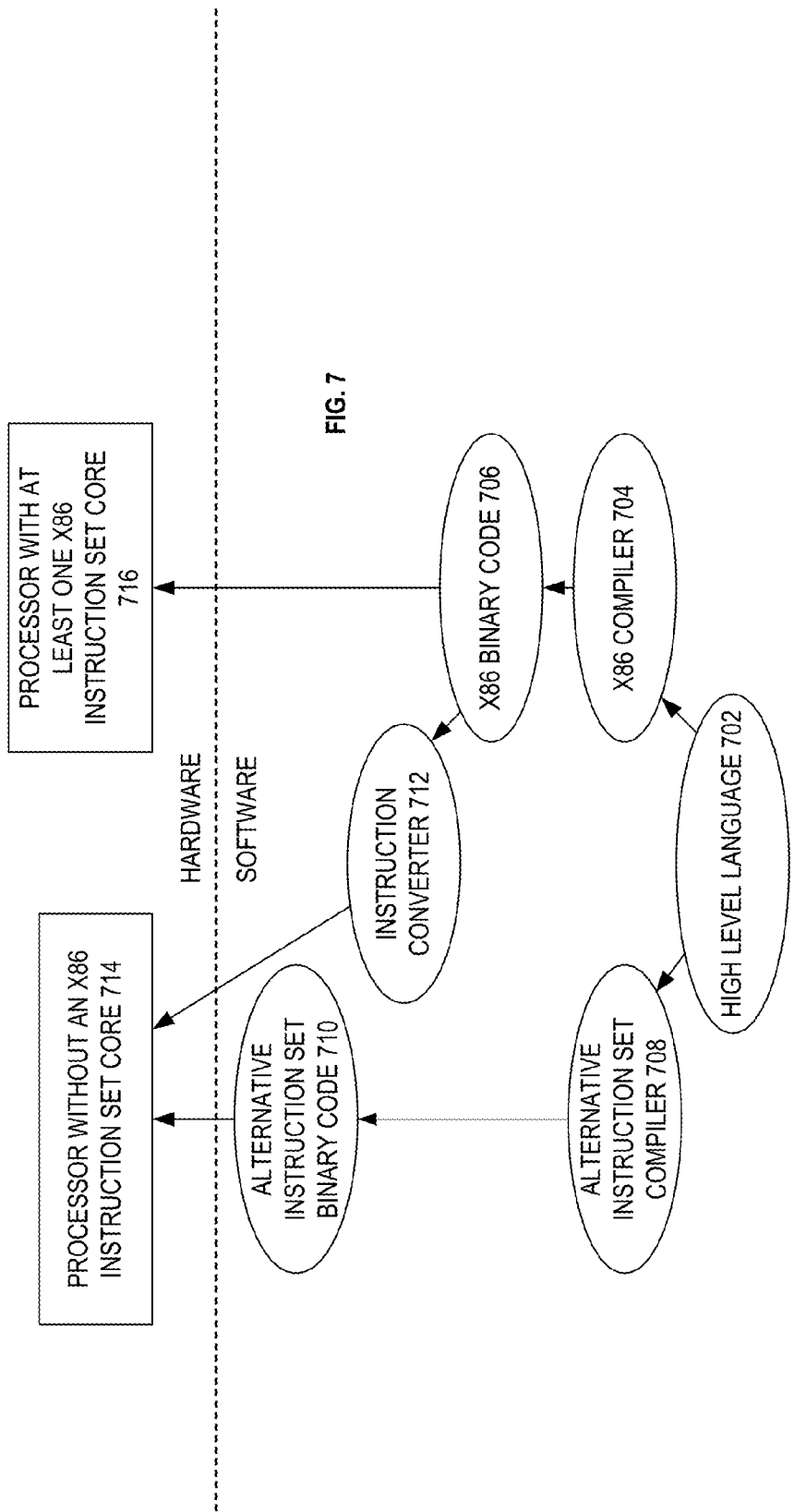
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Precise and Non-Precise Event Based Sampling (NEPBS)

The performance monitoring capability employed in current processors (such as IA processors) is built upon two sets of event counters: fixed function counters and the general purpose counters. Three fixed function counters are currently defined and implemented to count (1) instructions retired, (2) reference clocks, and (3) core clocks. Various concepts associated with precise event based sampling (PEBS) and non-precise event based sampling (NPEBS) will now be described followed by a detailed description of the embodiments of the invention.

Disclosed herein are embodiments for monitoring performance of a processing device to manage non-precise events. In some embodiments, the processing device collects non-precise events and stores architectural meta-data regarding the non-precise events in a non-intrusive manner utilizing a mechanism on the processing device without the intervention of a performance monitoring interrupt (PMI).

The operation of a processing device may include the occurrences of a plurality of events that monitor performance of the system. An event includes any operation, occurrence, or action in a processor. In one embodiment, the event is a response to a given instruction and data stream in the processing device. The events may be associated with architectural metadata including state information of the processing device including, but not limited to, an instruction pointer, a time stamp counter, and register state.

In some embodiments, a performance counter is configured to count one or more types of events. While the counter is incrementing or decrementing, software reads the counter at selected intervals to determine the number of events that have been counted between the intervals. The performance counter may generate a performance record or a performance monitoring interrupt (PMI) when the counter overflows. To trigger an overflow, the counter may be preset to a modulus value that may cause the counter to overflow after a specific number of events have been counted, which generates either a PMI or a performance record, such as a precise event based sampling (PEBS) record, as described in detail herein below.

There are several types of mechanisms for monitoring and managing various events. One type is PEBS mechanism, which functions to monitor and manage precise events. A precise event is a performance event that is linked to a specific instruction or micro-operation in an instruction trace and occurs when that instruction or micro-operation retires. Such precise events may include, but are not limited to, instructions retired, branch instructions retired, cache references, or cache misses, to name just a few examples. The PEBS mechanism may include several components, such as an event select (ES) control, a performance counter, a PEBS enable control and a PEBS handler. The ES control may programmed with an event identifier, which causes a performance counter corresponding to the ES control to start tracking (e.g., counting occurrences of) the programmed event corresponding to the event identifier.

Embodiments of the present disclosure also include a PEBS enable control of the processing device that controls when a PEBS record is generated. When the PEBS enable control is activated, a PEBS record is stored in a memory of the PEBS handler upon overflow of the performance counter corresponding to the PEBS enable control. In one embodiment, the user activates or sets the PEBS enable control. A PEBS record includes an architectural metadata of a state of the system upon the overflow of the performance counter. Such architectural metadata may include, but is not limited to, an Instruction Pointer (IP), Time Stamp Counter (TSC) and register state. As such, the PEBS record not only allows the location of the precise events in the instruction trace to be accurately profiled, but also provides for additional information for use in software optimization, hardware optimization, performance tuning, etc.

Embodiments of the disclosure further utilize the PEBS mechanism to track and manage non-precise events of the processing device. A non-precise event is a performance event that is either not linked to a specific instruction or micro-operation in an instruction trace or can occur speculatively even when the instruction or micro-operation does not retire. By way of example, a non-precise event may include, but is not limited to, reference clockticks, core clockticks, cycles when interrupts are masked, and so on. Previously, the PEBS mechanism would prevent generation of a PEBS record for non-precise events and performance monitoring of such non-precise events was limited to PMIs.

Embodiments of the disclosure introduce a non-precise event based sampling (NPEBS) module of the processing device that allows the PEBS handler to generate a PEBS record for programmed non-precise events and stores this PEBS record for the non-precise event in the memory storage of the PEBS handler. In one example, when the ES control is programmed with a non-precise event identifier and the corresponding PEBS enable control is set to generate a PEBS record for that programmed event, the performance counter associated with the ES control and the PEBS enable control tracks the programmed non-precise event. In one embodiment, the NPEBS module is coupled to the PEBS enable control, which is coupled to the performance counter such that when the performance counter overflows, the NPEBS module causes the PEBS enable control to generate the PEBS record for the non-precise event. Accordingly, the architectural meta-data associated with the non-precise event is captured without requiring a PMI.

In some embodiments, the NPEBS module controls timing of the generation of the PEBS record for the non-precise event. In one embodiment, the PEBS record for the non-precise event is generated immediately upon occurrence of the overflow of the performance counter tracking the non-precise event. In another embodiment, the PEBS record for the non-precise event may be generated immediately after the occurrence of the overflow of the performance counter tracking the non-precise events (e.g., upon execution of next subsequent instruction). In one embodiment, the NPEBS module stores the PEBS record for the non-precise event in memory storage of the PEBS handler.

The above technique of avoiding the use of PMI to capture architectural state of the system associated with non-precise events has many advantages. One such advantage is that storing architectural state of the non-precise event in the memory storage in this manner is not inhibited when interrupts are masked. Previously, non-precise events could only pend a PMI instead of logging a PEBS record. Unless the PMI was configured to cause a Non-Maskable Interrupt (NMI), the PMI was blocked while interrupts are masked, which obscures where the sample actually occurred. Use of NMIs can cause issues with stability and security on the system and are not allowed by all operating systems. Interrupts are masked in interrupt handlers, context switches, locking algorithms and other critical regions within privileged code (ring0). The amount of time in interrupt handling has increased with the switch toward SoC (Silicon on a Chip) which requires interrupts for interactions between the CPU and intellectual property (IP) units. Many event based sampling profiles are wrong because the PMI handler cannot be taken when interrupts are masked; leading to capture of an incorrect instruction pointer. In embodiments of the present disclosure, placing details of an event in the PEBS buffer is not inhibited when interrupts are masked, thus avoiding the drawbacks mentioned above with utilization of a PMI handler.

Another advantage of utilizing a PEBS handler for generation of a PEBS record for non-precise events is faster detection resulting in higher precision. The buffers of the hardware can be captured to take the instruction pointer (along with additional information on architectural state) with less latency than is required for the interrupt handler to enter upon a PMI. A further advantage is lower overhead on sampling. Multiple PEBS records (some or all may be corresponding to non-precise events) can be collected upon a single PMI to decrease the number of interrupts per sample (i.e., PEBS record) collected. Interrupts are expensive on the system and are responsible for the majority of the performance perturbation caused by event-based sampling. Thus, reducing the number of interrupts to obtain performance monitoring samples is advantageous.

Embodiments of the disclosure are compact circuits, and therefore may be implemented as an integral part of a wide range of processing units without incurring significant increase of cost and power consumption. Embodiments of the disclosure are programmable circuit logics, and therefore may be used to track and manage different types of non-precise events on the same circuit logic. The NPEBS module is also extensible to track multiple processing units. The NPEBS module may be shared by a plurality of applications running on a same processor and managed by an operating system (OS) or a virtual machine as a shared resource.

Figure 8:
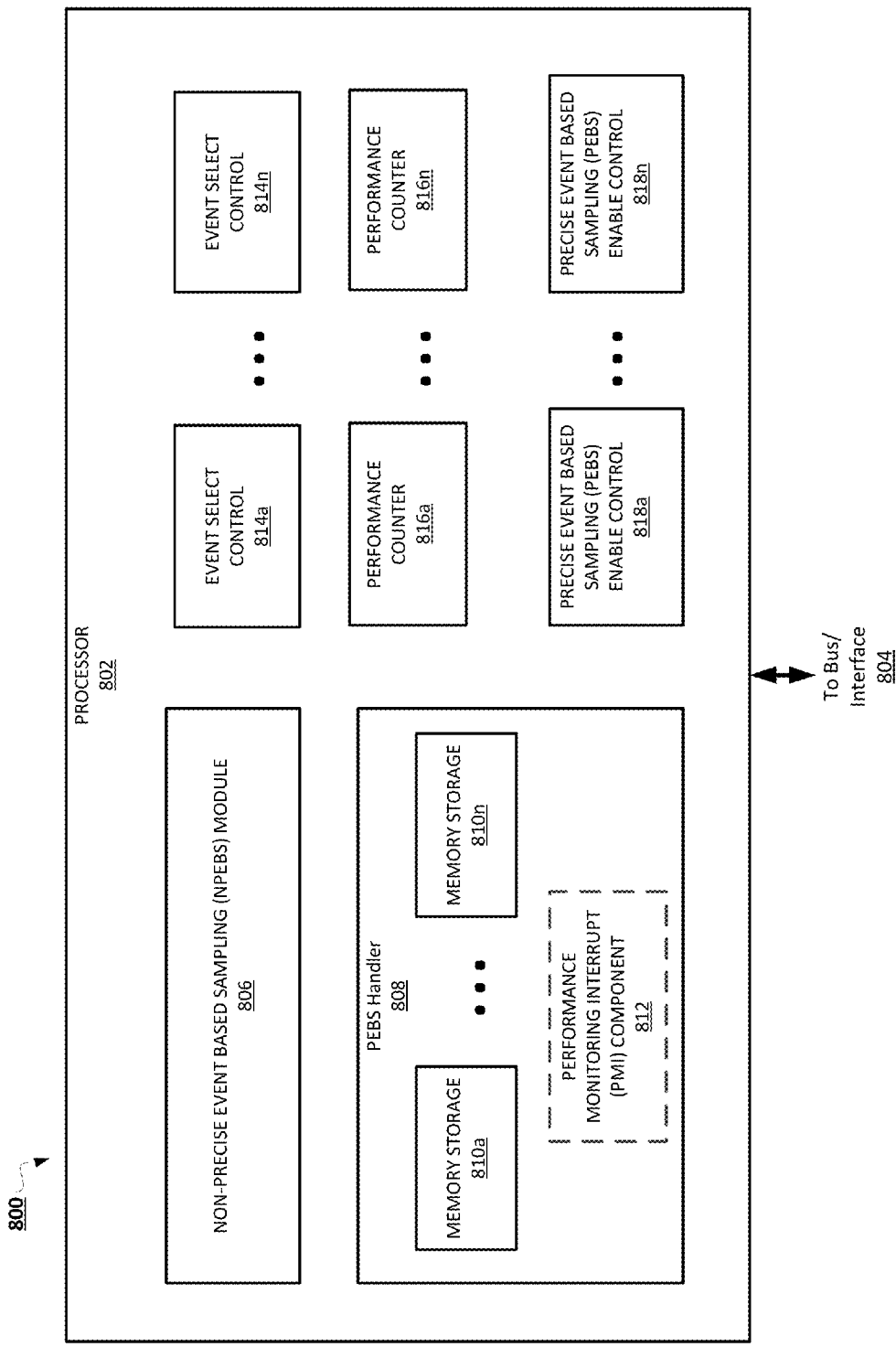
FIG. 8 is a block diagram of system architecture, according to one embodiment of the disclosure.

FIG. 8 illustrates a system architecture 800 that includes an NPEBS module 806 and components of a PEBS mechanism according to an embodiment of the present disclosure. In one embodiment, the system architecture may be a system-on-a-chip hardware circuit block that may be implemented on a single die (a same substrate) and within a single semiconductor package. The processing unit may be a central processing unit (CPU) or a graphic processing unit (GPU).

Referring to FIG. 8, the processing unit may include a processor 802 coupled to a bus/interconnect fabric 804. In one embodiment, the processor 802 includes an NPEBS module 806 and a PEBS handler 808 having one or more memory storages 810a to 810n. In one embodiment, the memory storages 810 are physical memory storages such as a buffer. The PEBS handler 808 may also include a performance monitoring interrupt (PMI) component 812. The processor may also include one or more event select (ES) controls 814a to 814n (referred to herein as "ES control 814") corresponding to one or more performance counters 816a to 816n (referred to herein as "performance counter 816") and corresponding to one or more PEBS enable controls 818a to 818n (referred to herein as "PEBS enable control 818"). In some implementations, PEBS enable controls 818a-818n may be located in a single control register (e.g., model specific register).

The processor 802 may include various other known components (not shown) to perform algorithms to process data, in accordance with the present invention. For example, the processor 802 may include a memory (not shown) such as a Level 1 (L1) internal cache. Depending on the architecture, the processor 802 may have a single internal cache or multiple levels of internal cache. Alternatively, in another embodiment, the cache memory may reside external to the processor 802. Other embodiments may also include a combination of both internal and external caches depending on the particular implementation and needs.

Processor 802 may execute a stream of instructions that may be embedded with markers for events that may be placed on a bus/interconnect fabric 804. The execution of a segment of instructions may constitute one or more non-precise events. A non-precise event is a performance event that is either not linked to a specific instruction or micro-operation in an instruction trace or can occur speculatively when the instruction or micro-operation does not retire. Such non-precise events may include, but are not limited to, reference clocks, core clocks and cycles, to name a few examples. In one embodiment, the non-precise event is generated by the processor 802. In another embodiment, the non-precise event is generated outside the processor 802 and communicated to the processor via the bus/interconnect fabric 804.

In one embodiment, ES control 814 is programmed with an identifier of a non-precise event. The ES control 814 may be provided as a model specific register (MSR). This programming of the ES control 814 causes a performance counter 816 corresponding to the programmed ES control 814 to track occurrences of the particular programmed non-precise event. In some embodiments, any event that is not defined as a precise event is considered a non-precise event. In one embodiment, the ES control 814 is programmed by an executing application. In another embodiment, a user may program the ES control 814 with the non-precise event identifier.

When the ES control 814 is programmed with a non-precise event identifier, the performance counter 816 corresponding to the ES control 814 is incremented or decremented upon each occurrence of the programmed non-precise event. A PEBS enable control 818 corresponding to the ES control 814 and the performance counter 816 may be set (e.g., activated, flag set, bit set to 1, etc.) to generate a PEBS record upon overflow of the performance counter 816 or, if the counter is decremented, upon the performance counter 816 reaching 0. The PEBS enable control 818 may be provided as a MSR. In one embodiment, the user sets the PEBS enable control 818. In one example, the PEBS enable control 818 includes a PEBS_ENABLE bit, which is set to enable the PEBS handler 808 to generate a PEBS record upon overflow or 0 value of the performance counter 816 that is counting the non-precise event. As discussed above, a PEBS record includes an architectural metadata of a state of the system upon the overflow or 0 of the performance counter. The architectural metadata may include, but is not limited to, an IP, TSC, or register state, for example.

In one embodiment, the NPEBS module 806 is coupled to the PEBS enable control 818 such that when the performance counter 816 overflows or reaches 0, the NPEBS module 806 causes the PEBS enable control 818 to generate the PEBS record for the non-precise event. In some embodiments, the NPEBS module 806 controls timing of generation of the PEBS record for the non-precise event. For example, in one embodiment, the NPEBS module 806 may cause the PEBS enable control 818 to generate the PEBS record for the non-precise event immediately upon occurrence of the overflow of the performance counter 816 tracking and counting the programmed non-precise event.

In another embodiment, the NPEBS module 806 may cause the PEBS enable control 818 to generate the PEBS record for the non-precise event immediately after the occurrence of the overflow or zero value of the performance counter 816 tracking and counting the programmed non-precise event. In this embodiment, the PEBS record is generated after the next instruction that retires (i.e., after completion of the next instruction in the instruction trace that triggered the performance counter 816 to overflow). In one embodiment, the PEBS record generated for the non-precise event by PEBS handler 808 is stored in memory storage 810 of the PEBS handler 808. Accordingly, the architectural meta-data associated with the non-precise event is captured without utilizing a PMI.

In one embodiment, the PMI component 812 may function to collect the PEBS records stored in the memory storage(s) 810a-810n of PEBS handler 808. The PMI component 812 may immediately collect the PEBS records stored in the memory storage 810a-810n. In another embodiment, the PMI component 812 may be delayed in collecting the PEBS records in memory storages 810a-810n at once. The interface may be provided as a model specific register (MSR).

Figure 9A:
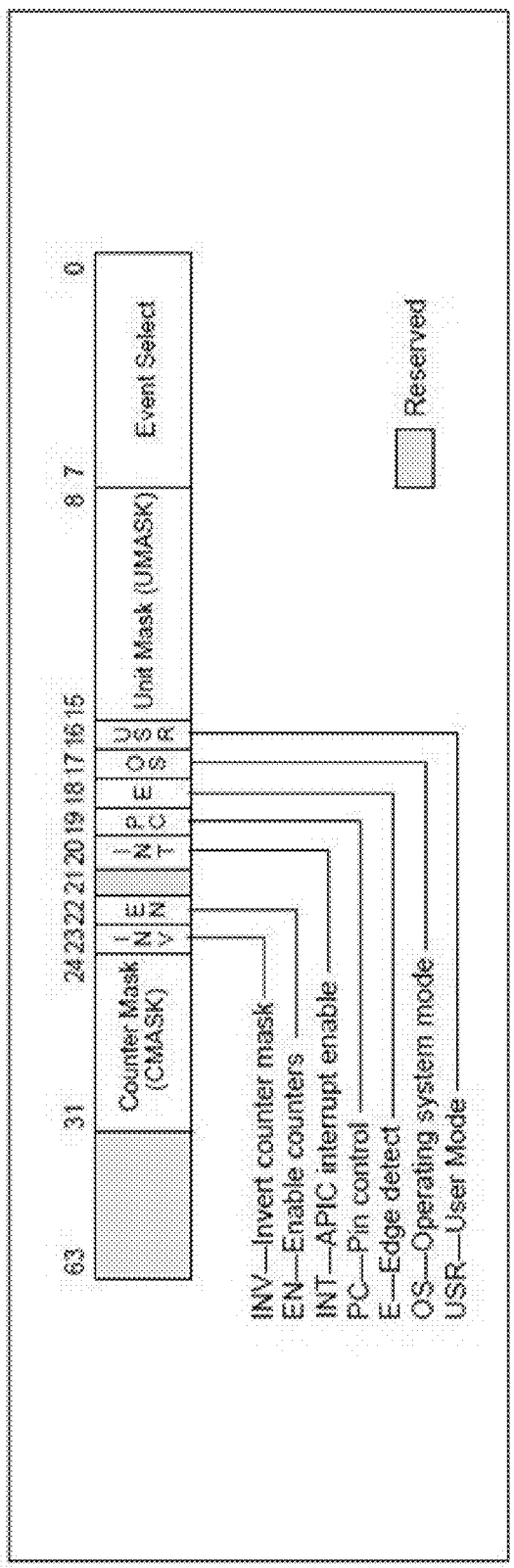
FIG. 9A illustrates a layout of bit fields for model specific register according to one embodiment of the disclosure.

FIG. 9A illustrates exemplary layout 900 of bit fields for event select (ES) control MSR in accordance with one embodiment of the present invention. The ES control MSR may be the same as ES control 814 described with respect to FIG. 8. The layout 900 of the ES control MSR may provide a comprehensive, standardized layout for utilizing event select controls and performance counters as the MSRs in the processor to manage events. In an embodiment, the layout 900 may be a register(s) file, which may include individual bit positions corresponding to each component in the processor. The layout 900 may include event select bits 0 through 7 to identify the events generated in the processing device. As discussed above, an event may be a precise event or a non-precise event.

The layout 900 may also include unit mask (UMASK) bits 8 through 15, each of which define a specific architectural state information of the processing device. The layout 900 may also include a user mode (USR) bit 16, which specifies the selected architectural state is counted only when the processor is operating at privilege levels, for example, levels 1, 2 or 3. The layout 900 may also include an operating system (OS) mode bit 17, which specifies that the selected architectural state is counted only when the processor is operating at the privilege level 0. In one example, the OS mode bit 17 may be with the USR bit 16.

The layout 900 may also include an edge detect (E) bit 18, which enables (when set) edge detection of the selected architectural state. The processor may count the number of deasserted to asserted transitions for any state that may be expressed by the other bits. In one embodiment, such mechanism does not permit back-to-back assertions to be distinguished and allows software to measure not only the fraction of time spent in a particular state, but also the average length of time spent in such a state (for example, the time spent waiting for an interrupt to be serviced). The layout 900 may further include a pin control (PC) bit 19, which when set causes the processor to toggle PMI pins and increments the performance counter when performance monitoring events occur and when clear, the processor toggles the PMI pins when the performance counter overflows. The toggling of a pin is defined as assertion of the pin for a single bus clock followed by deassertion.

The layout 900 may further include an advanced programmable interrupt controller (APIC) interrupt enable (INT) bit 20, which when set, causes the processor to generate an exception through its local APIC on the performance counter overflow. The layout 900 may further include an enable counter (EN) bit 22, which, when set, causes the performance counter to be enabled in the corresponding performance counter. The performance counter may be the same as performance counter 816 described with respect to FIG. 8. When the EN bit 22 is cleared, the corresponding performance counter is disabled. In one embodiment, the event logic unit for a counter-mask (CMASK) is disabled by setting the EN bit 23 to 0 before writing into the performance counter. The layout 900 may further include an invert (INV) bit 23, which when set, inverts the counter-mask (CMASK) comparison, so that both greater than or equal to and less than comparisons can be made (For example, 0: greater than or equal; 1: less than).

In one embodiment, when the counter-mask bits are programmed to zero, INV bit 23 is ignored. The layout 900 may further include the counter-mask (CMASK) bits 24 to 31, which when are not zero, the processor compares this mask to the events count of the detected architectural state during a single cycle. In one embodiment, if the event count is greater than or equal to this mask, the performance counter is incremented by one. In one embodiment, when the event count is less than this mask, the performance counter is not incremented. In one embodiment, the CMASK bit is intended for software to characterize architectural states that can count multiple occurrences per cycle (for example, two or more instructions retired per clock; or bus queue occupations). If the CMASK bit is 0, then the performance counter is incremented each cycle by the event count associated with multiple occurrences.

Figure 9B:
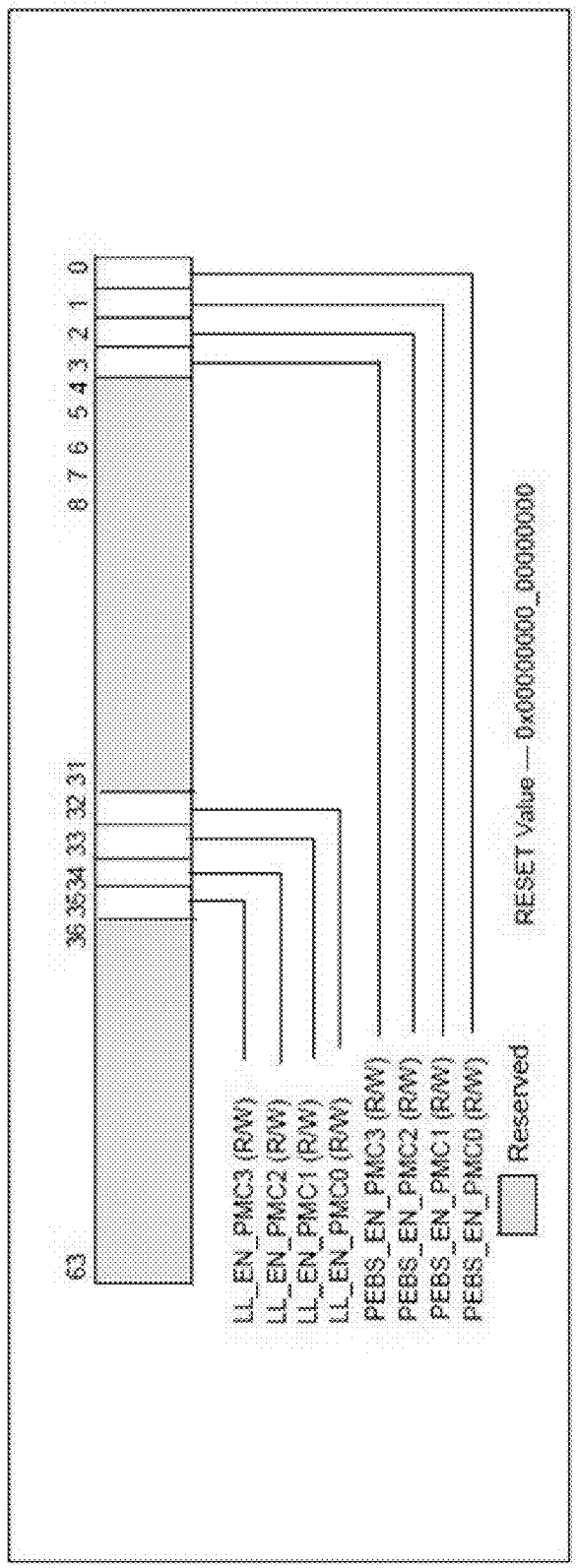
FIG. 9B illustrates a layout of bit fields for model specific register according to one embodiment of the disclosure.

FIG. 9B illustrates exemplary layout 902 of bit fields for the PEBS enable control MSR in accordance with one embodiment of the present invention. In one embodiment, the PEBS control MSR is the same as PEBS enable control 818 described with respect to FIG. 8. The layout 902 may provide a comprehensive, standardized layout for utilizing the PEBS enable control as the MSR in the processor to manage events. In an embodiment, the layout 902 may be a register(s) file, which may include individual bit positions corresponding to each component in the processor. The layout 902 may include PEBS enable control bits 0 through 3 (PEBS_EN_PMC0, PEBS_EN_PMC1, PEBS_EN_PMC2, PEBS_EN_PMC3), which are enabled to indicate when an overflow or zero condition in a particular performance counter (e.g., performance counter 816 of FIG. 8) causes a PEBS record to be generated and stored in memory storage of the PEBS handler (e.g., PEBS handler 808 of FIG. 8). The layout 902 may also include bits 32-35 (LL_EN_PMC0, LL_EN_PMC0, LL_EN_PMC0, LL_EN_PMC0), which allow the PEBS record to capture latency information upon overflow or zero condition of the performance counter.

Figure 10:
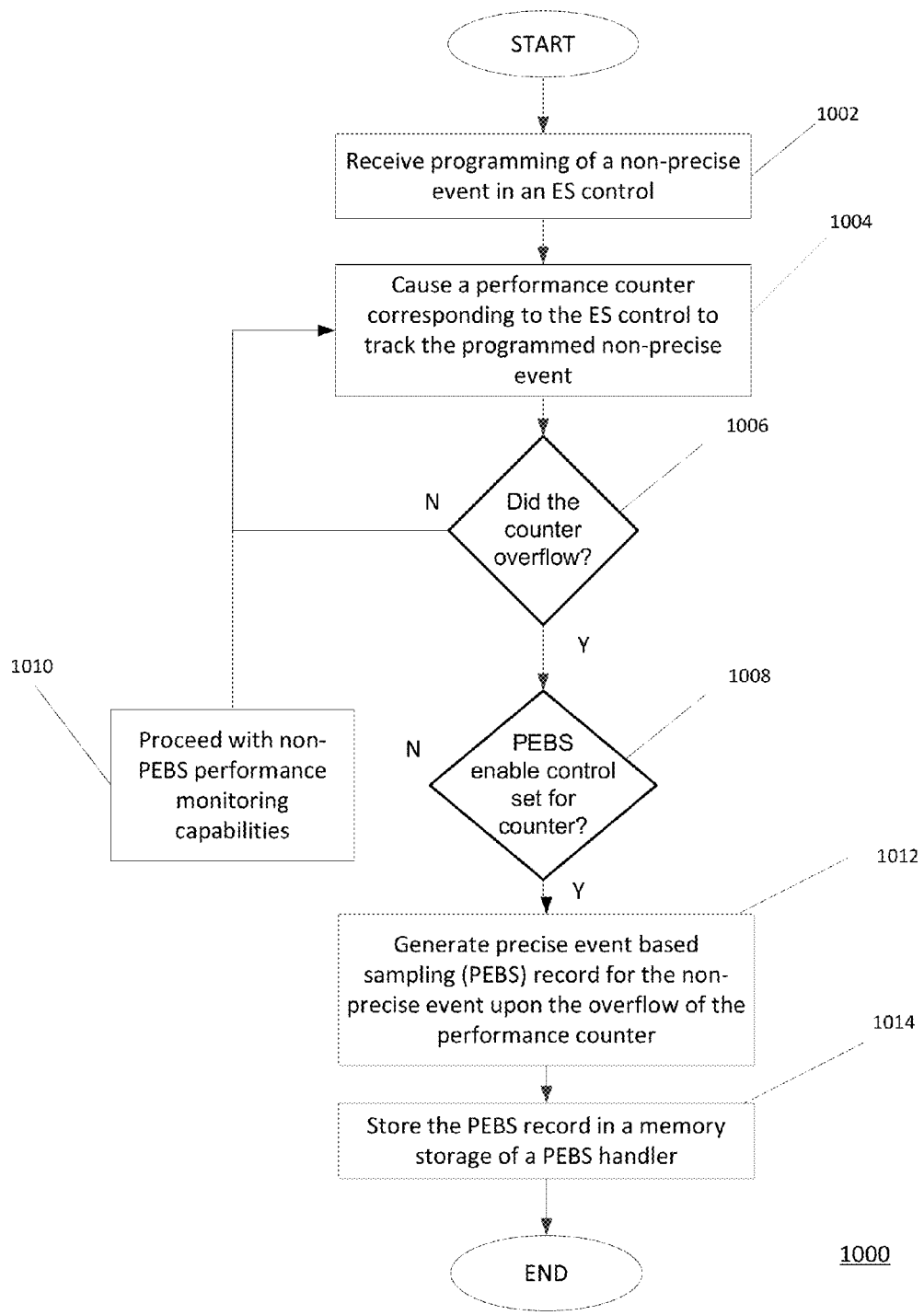
FIG. 10 is a flow diagram of a method for monitoring performance of a processing device to manage non-precise events according to one embodiment of the disclosure.

FIG. 10 is a flow diagram of a method for monitoring performance of a processing device to manage non-precise events according to an embodiment of the disclosure. Method 1000 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 1000 may be performed, in part, by processor 802 described above with respect to FIG. 8.

For simplicity of explanation, the method 1000 is depicted and described as a series of acts. However, acts in accordance with this disclosure can occur in various orders and/or concurrently and with other acts not presented and described herein. Furthermore, not all illustrated acts may be performed to implement the method 1000 in accordance with the disclosed subject matter. In addition, those skilled in the art will understand and appreciate that the method 1000 could alternatively be represented as a series of interrelated states via a state diagram or events.

Referring to FIG. 10, at 1002 the processing logic receives programming of non-precise event in an ES control. In one embodiment, a non-precise event is a performance event that is either not linked to a specific instruction or micro-operation in an instruction trace or can occur speculatively even then the instruction or micro-operation does not retire. The non-precise event may include, but is not limited to, reference clock, core clocks and cycles. As discussed above, in one embodiment, the non-precise event is generated in the processor. In another embodiment, the non-precise event is generated outside the processor and the processing logic may detect the non-precise event by monitoring an interconnect fabric on which events may place alarm signals. At block 1004, a performance counter corresponding to the ES control is caused to track the programmed non-precise event. For example, a value in the performance counter counting the non-precise events may be incremented upon each occurrence of the non-precise event.

At block 1006, it is determined whether the performance counter overflowed. When it is determined at block 1006 that the performance counter did not overflow, block 1004 is repeated for the performance counter to continue tracking the non-precise event. When it is determined at block 1006 that the performance counter did overflow, then method 1000 proceeds to decision block 1008 where it is determined whether a PEBS enable control is set for the performance counter. If the PEBS enable control is not set, then method 1000 proceeds to block 1010 where non-PEBS performance monitoring capabilities are performed. Method 1000 then returns to block 1004 to repeat the tracking of the non-precise event occurrences.

On the other hand, if the PEBS enable control for the performance counter is set, then method 1000 continues to block 1012 where a PEBS record for the non-precise events is generated upon the overflow. In one embodiment, the PEBS record for the non-precise event is generated immediately upon occurrence of the overflow of the performance counter counting the non-precise events. In another embodiment, the PEBS record for the non-precise event is generated immediately after the occurrence of the overflow of the performance counter counting the non-precise events. In this embodiment, the PEBS record is generated after the next instruction that retires, i.e. after completion of the next instruction in the instruction trace that triggered the performance counter to overflow.

The PEBS record may include an architectural metadata of a state of the processing device upon the overflow of the performance counter. The architectural metadata may include, but is not limited to, an IP, a TSC, and register state, to name a few examples. As such, the architectural metadata of a processing device associated with a non-precise event may be quickly captured without utilizing a PMI. At block 1014, the generated PEBS record for the non-precise event is stored in a memory storage of the PEBS handler.

Figure 11A:
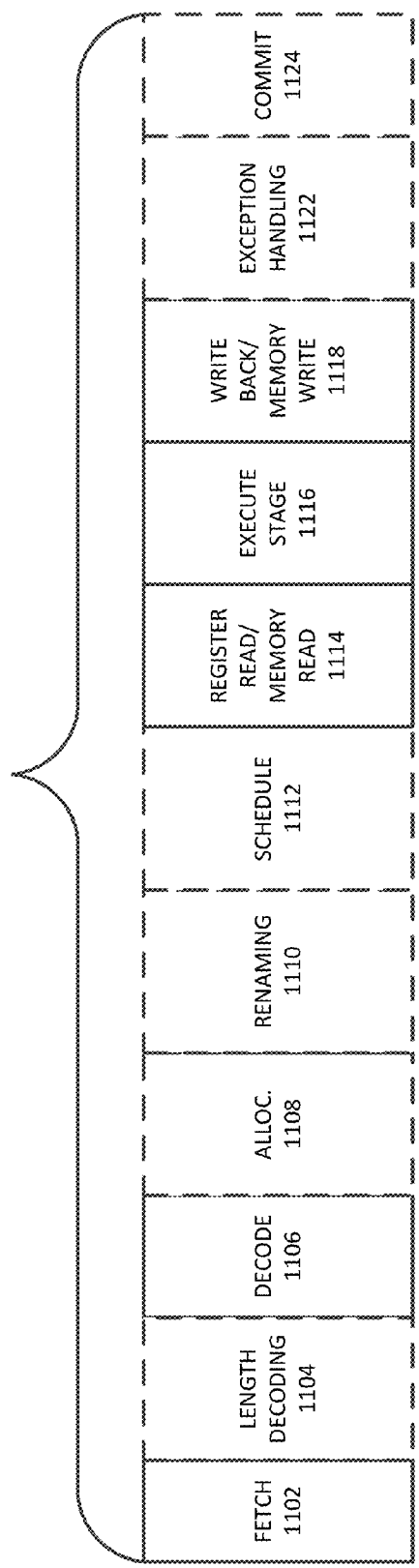
FIGS. 11A-B are a block diagrams illustrating an exemplary in order pipeline and an exemplary register renaming, out-of-order issue/execution pipeline in accordance with described embodiments.
Figure 11B:
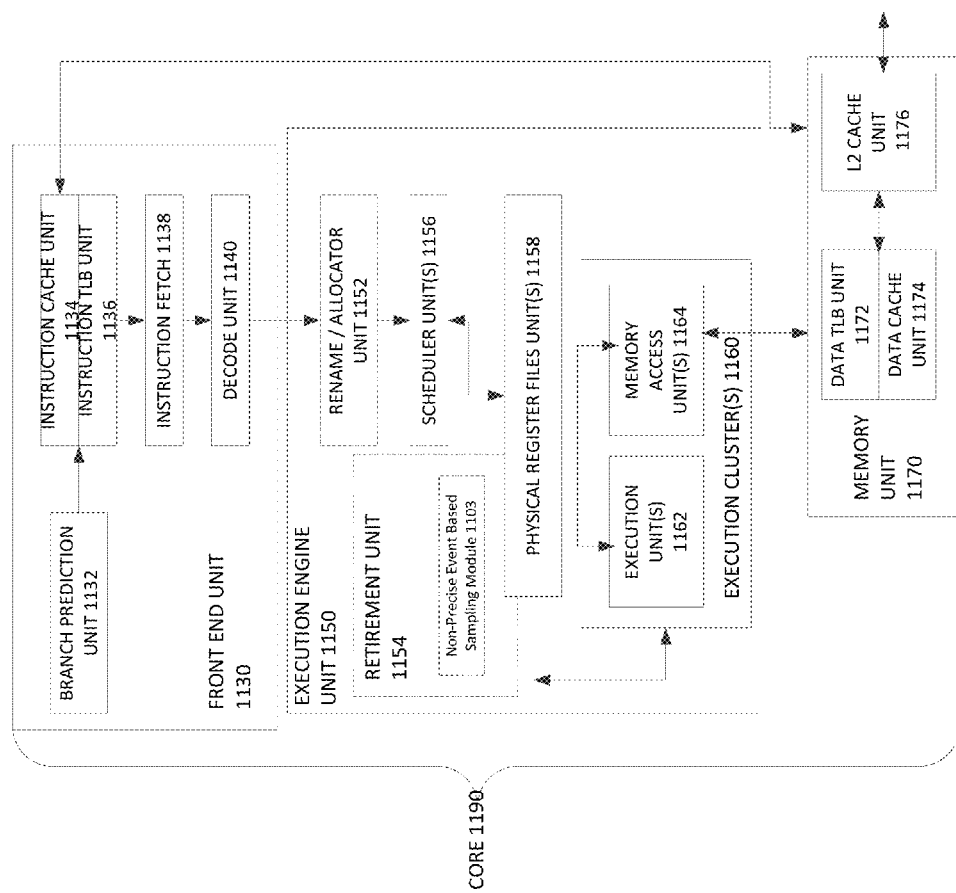

FIG. 11A is a block diagram illustrating an in-order pipeline and a register re-naming stage, out-of-order issue/execution pipeline of a processor monitoring performance of a processing device to manage non-precise events according to at least one embodiment of the invention. FIG. 11B is a block diagram illustrating an in-order architecture core and a register renaming logic, out-of-order issue/execution logic to be included in a processor according to at least one embodiment of the invention. The solid lined boxes in FIG. 11A illustrate the in-order pipeline, while the dashed lined boxes illustrates the register renaming, out-of-order issue/execution pipeline. Similarly, the solid lined boxes in FIG.

11B illustrate the in-order architecture logic, while the dashed lined boxes illustrates the register renaming logic and out-of-order issue/execution logic.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124. In some embodiments, the stages are provided in a different order and different stages may be considered in-order and out-of-order.

In FIG. 11B, arrows denote a coupling between two or more units and the direction of the arrow indicates a direction of data flow between those units. FIG. 11B shows processor core 1190 including a front end unit 1130 coupled to an execution engine unit 1150, and both are coupled to a memory unit 70.

The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to a level 2 (L2) cache unit 1176 in the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The retirement unit 1154 may include a non-precise event based sampling (NPEBS) module 1103 to monitor performance of a processing device to manage non-precise events according to embodiments of the invention. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1158 is overlapped by the retirement unit 1154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 38 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
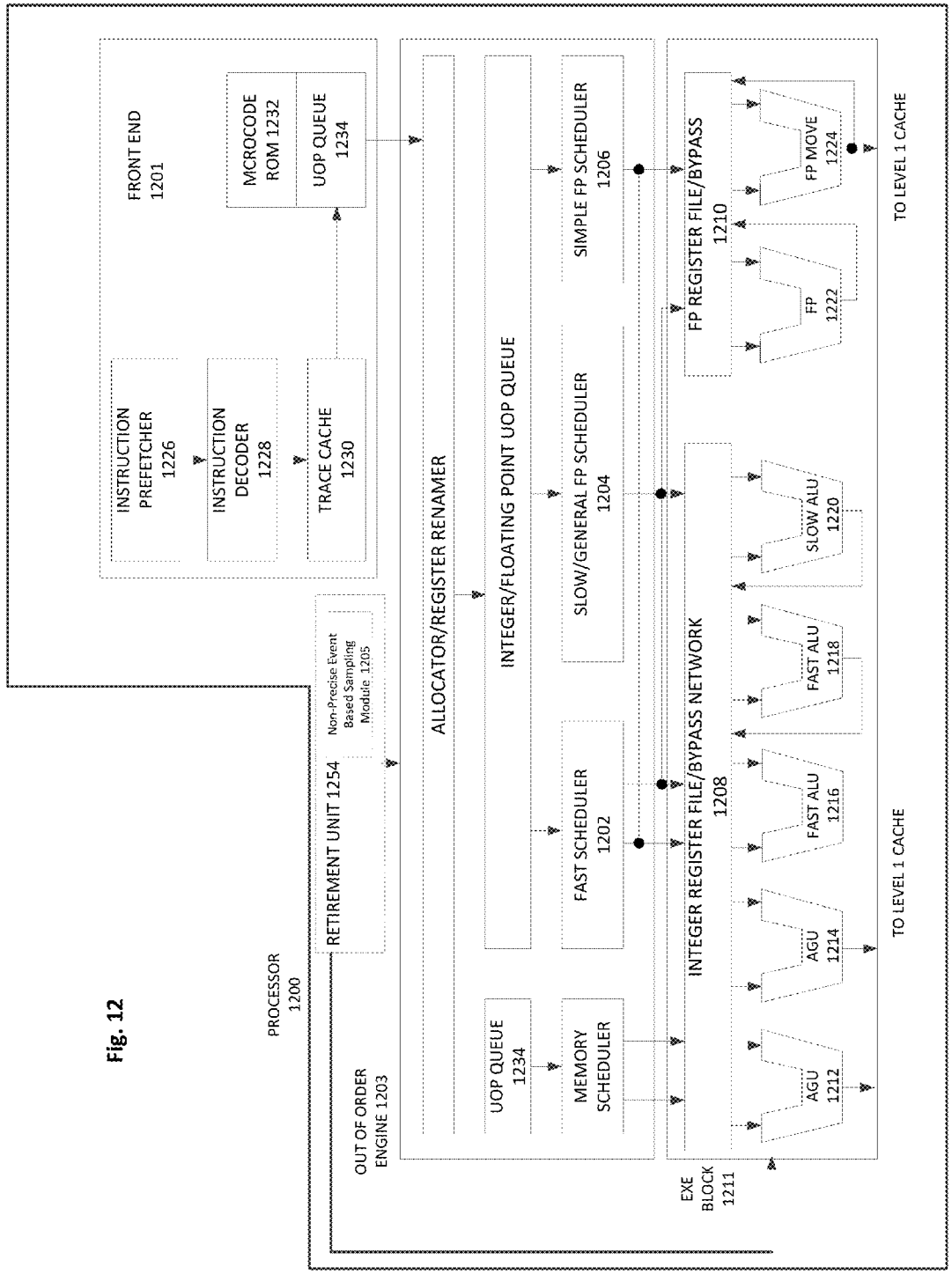
FIG. 12 is a block diagram illustrating both an exemplary embodiment of an in-order architecture core and an exemplary register renaming, out-of-order issue/execution architecture core to be included in a processor in accordance with described embodiments.

FIG. 12 is a block diagram illustrating a micro-architecture for a processor 1200 that includes logic circuits to perform instructions in accordance with one embodiment of the invention. In one embodiment, processor 1200 monitors performance of a processing device to manage non-precise events. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1201 is the part of the processor 1200 that fetches instructions to be executed and prepares them to be used later in the processor pipeline. The front end 1201 may include several units. In one embodiment, the instruction prefetcher 1226 fetches instructions from memory and feeds them to an instruction decoder 1228, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 1230 takes decoded uops and assembles them into program ordered sequences or traces in the uop queue 1234 for execution. When the trace cache 1230 encounters a complex instruction, the microcode ROM 1232 provides the uops needed to complete the operation.

Some instructions are converted into a single micro-op, whereas others use several micro-ops to complete the full operation. In one embodiment, if more than four micro-ops are needed to complete an instruction, the decoder 1228 accesses the microcode ROM 1232 to do the instruction. For one embodiment, an instruction can be decoded into a small number of micro ops for processing at the instruction decoder 1228. In another embodiment, an instruction can be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one embodiment from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1202, slow/general floating point scheduler 1204, and simple floating point scheduler 1206. The uop schedulers 1202, 1204, 1206 determine when a uop is ready to execute based on the readiness of their dependent input register operand sources and the availability of the execution resources the uops use to complete their operation. The fast scheduler 1202 of one embodiment can schedule on each half of the main clock cycle while the other schedulers can schedule once per main processor clock cycle. The schedulers arbitrate for the dispatch ports to schedule uops for execution.

Register files 1208, 1210 sit between the schedulers 1202, 1204, 1206, and the execution units 1212, 1214, 1216, 1218, 1220, 1222, 1224 in the execution block 1211. There is a separate register file for integer and floating point operations, respectively. Each register file 1208, 1210, of one embodiment also includes a bypass network that can bypass or forward just completed results that have not yet been written into the register file to new dependent uops. The integer register file 1208 and the floating point register file 1210 are also capable of communicating data with the other. For one embodiment, the integer register file 1208 is split into two separate register files, one register file for the low order 32 bits of data and a second register file for the high order 32 bits of data. The floating point register file 1210 of one embodiment has 128 bit wide entries because floating point instructions typically have operands from 66 to 128 bits in width.

The execution block 1211 contains the execution units 1212, 1214, 1216, 1218, 1220, 1222, 1224, where the instructions are actually executed. This section includes the register files 1208, 1210, that store the integer and floating point data operand values that the micro-instructions use to execute. The processor 1200 of one embodiment is comprised of a number of execution units: address generation unit (AGU) 1212, AGU 1214, fast ALU 1216, fast ALU 1218, slow ALU 1220, floating point ALU 1222, floating point move unit 1224. For one embodiment, the floating point execution blocks 1222, 1224, execute floating point, MMX, SIMD, and SSE, or other operations. The floating point ALU 1222 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 1216, 1218. The fast ALUs 1216, 1218, of one embodiment can execute fast operations with an effective latency of half a clock cycle. For one embodiment, most complex integer operations go to the slow ALU 1220 as the slow ALU 1220 includes integer execution hardware for long latency type of operations, such as a multiplier, shifts, flag logic, and branch processing. Memory load/store operations are executed by the AG Us 1212, 1214. For one embodiment, the integer ALUs 1216, 1218, 1220 are described in the context of performing integer operations on 64 bit data operands. In alternative embodiments, the ALUs 1216, 1218, 1220 can be implemented to support a variety of data bits including 16, 32, 128, 256, etc. Similarly, the floating point units 1222, 1224 can be implemented to support a range of operands having bits of various widths. For one embodiment, the floating point units 1222, 1224 can operate on 128 bits wide packed data operands in conjunction with SIMD and multimedia instructions.

In one embodiment, the uops schedulers 1202, 1204, 1206 dispatch dependent operations before the parent load has finished executing. As uops are speculatively scheduled and executed in processor 1200, the processor 1200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 1200 may include a retirement unit 1254 coupled to the execution block 1211. The retirement unit 1254 may include a NPEBS module 1205 to monitor performance of a processing device to manage non-precise events according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Apparatus and Method for Implementing PEBS and NPEBS Using Fixed Function Counters In one embodiment, the performance monitoring techniques described herein are built upon two sets of event counters: fixed function counters and general purpose counters. Three fixed function counters are currently defined and implemented to count instructions retired, reference clocks, and core clocks. In the embodiments described above, in order to perform PEBS-based sampling for fixed performance monitoring events, such as instructions retired, reference clocks, and core clocks, the general purpose counters 116a-n must be configured with those events, consuming an important processor resource.

To address this limitation, one embodiment of the invention complements the (non-) precise event based sampling feature that exists using the general purpose counters 116a-n by allowing the fixed performance counters to implement PEBS, NPEBS, and precise distribution of instructions retired (PDIR). This invention is synergistic with the PEBS architecture described above to support both precise and non-precise events. Out of the three fixed events, only instructions retired will be truly precise while the core and reference clocks events will be non-precise precise events that use the NPEBS triggering mechanism.

As used herein, Precise Event Based Sampling (PEBS) includes a debug store mechanism to periodically store a set of architectural state information. To sample every "$n^{th}$" event, "−n" may be programmed into the counter as well as into a memory-based control block location associated with the counter. When the counter reaches 0, and after a slight pipeline delay (in which additional events may occur), the next event causes a sample to be taken. The counter will then be reloaded with "−n" from the memory-based control block and execution and counting continue. Only a subset of events in the general purpose counter event list currently support PEBS, which includes instructions retired, but not reference clocks or core clocks. The sample is collected using a combination of hardware and microcode, and does not require an interrupt or any macrocode execution. Once the buffer fills to a predefined threshold, a Performance Monitoring Interrupt (PMI) is taken, and a macrocode handler is invoked to process the samples in the buffer.

In one embodiment, Precise Distribution of Instructions retired (PDIR) is a feature that may be applied to some of the general purpose counters which aims to reduce the aforementioned "slight pipeline delay" thus reducing missed events between the counter overflowing and the sample being taken.

In one embodiment, Non-Precise Event Based Sampling (NPEBS) uses the same debug store mechanism as PEBS to periodically store a set of architectural state information, but with a slightly different semantic. The same sampling control mechanism is used, but the sample is taken at the next opportunity after the counter reaches 0. It is considered "non-precise" because the sampled instruction may not be the one that experienced the event. NPEBS is engaged when PEBS is configured for an event that is not part of the PEBS-able event list such as Reference Clocks and Core Clocks. In the embodiments described above, it is implemented on general purpose counters 116a-n. Without NPEBS, the only way to get statistical samples based on clock events is to take a costly PMI each time an appropriately configured counter overflows.

Figure 13:
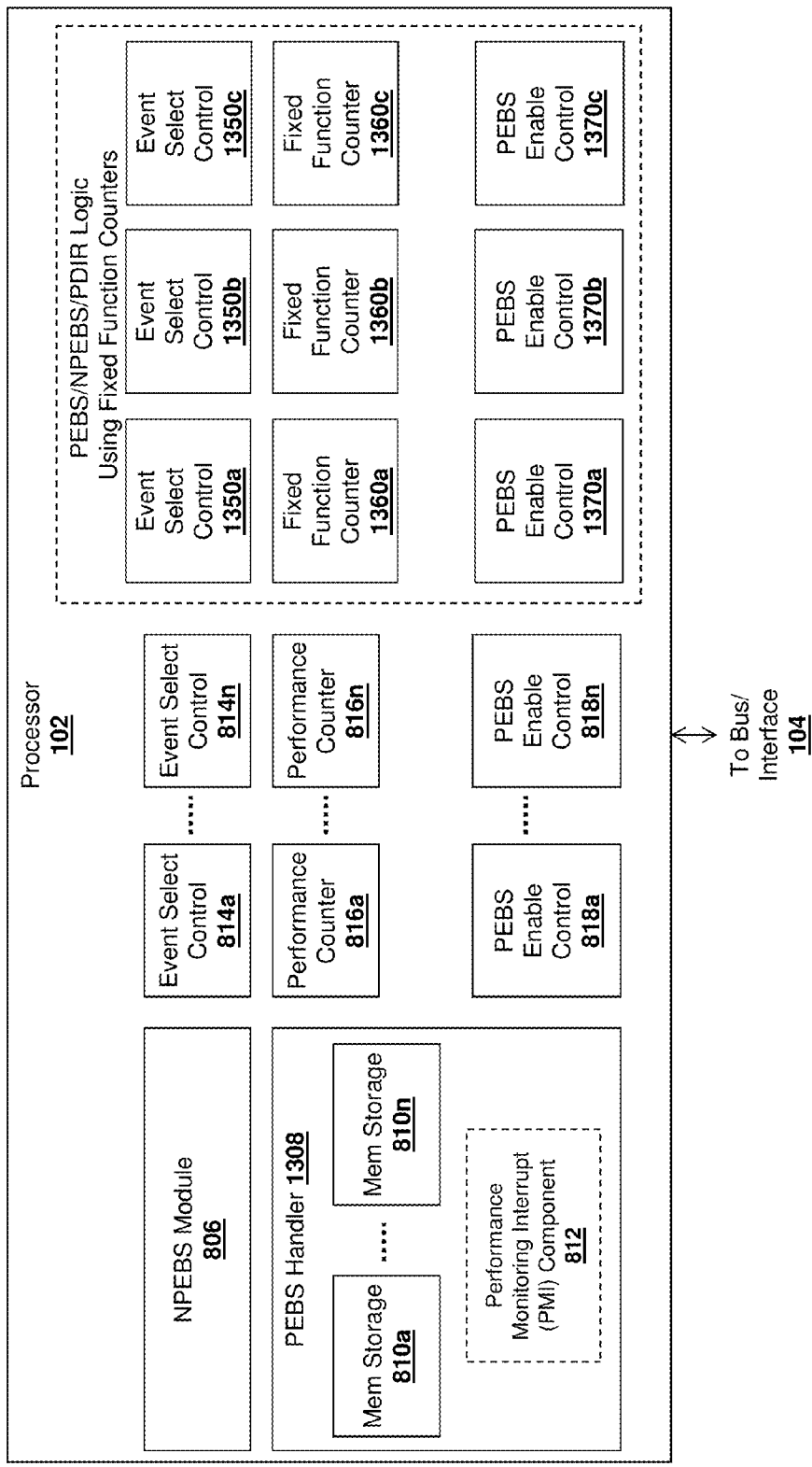
FIG. 13 is a block diagram illustrating a processor according to one embodiment.

FIG. 13 illustrates a processor 102 with many of the same (or similar) components as described above with respect to FIG. 8 including an NPEBS module 806 and a PEBS handler 808 having one or more memory storages 810a to 810n (which may be implemented as physical memory storage such as a buffer). The PEBS handler 808 may also include a performance monitoring interrupt (PMI) component 812 as described above. In addition, the processor 102 may include one or more event select (ES) controls 814a to 814n corresponding to one or more general purpose performance counters 816a-816n and further corresponding to one or more PEBS enable controls 818a-818n (details of which are described above). In some implementations, PEBS enable controls 818a-818n may be located in a single control register (e.g., model specific register).

In addition, in the embodiment shown in FIG. 13, PEBS, NPEBS, and PDIR operations are applied using fixed function counters 1360a-c. In one embodiment, the three fixed function counters 1360a-c are defined and implemented to count instructions retired, reference clocks, and core clocks. It will be appreciated, however, that the underlying principles of the invention are not limited to any particular number of fixed function counters or any particular fixed function counter implementation.

As mentioned, the processor 802 may execute a stream of instructions that may be embedded with markers for events that may be placed on a bus/interconnect fabric 804. The execution of a segment of instructions may constitute one or more non-precise events. A non-precise event is a performance event that is either not linked to a specific instruction or micro-operation in an instruction trace or can occur speculatively when the instruction or micro-operation does not retire. Such non-precise events may include, but are not limited to, reference clocks, core clocks and cycles, to name a few examples. In one embodiment, the non-precise event is generated by the processor 802. In another embodiment, the non-precise event is generated outside the processor 802 and communicated to the processor via the bus/interconnect fabric 804.

In one embodiment, event select (ES) controls 1350a-c shown in FIG. 13 perform similar operations to ES controls 814a-c described above but correspond to the fixed function performance counters 1360a-c and further correspond PEBS enable controls 1370a-c associated with the fixed function counters 1360a-c. In one embodiment, the PEBS enable controls 818a-818n and 1370a-c are located in a single control register.

Figure 14A:
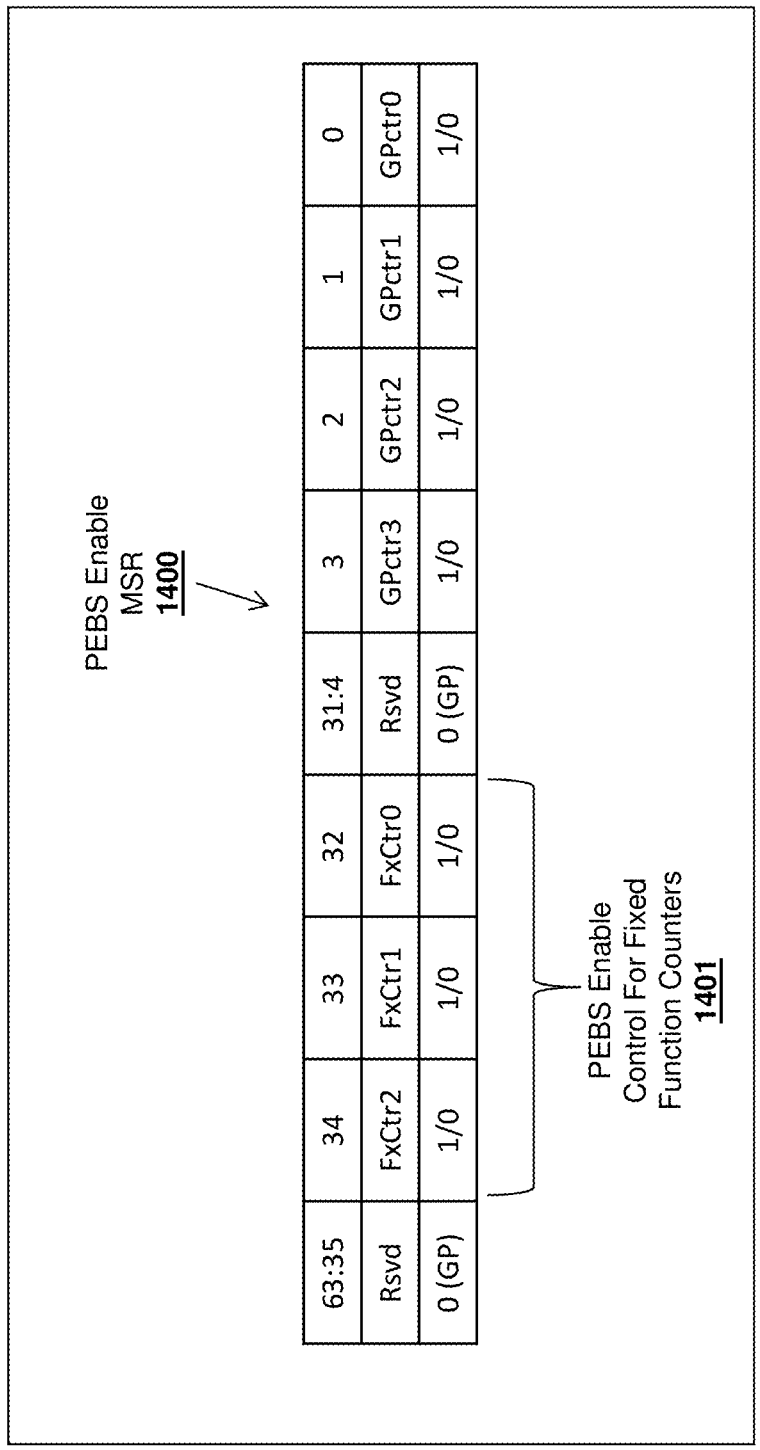
FIG. 14A-B illustrates different registers for enabling event based sampling on a fixed function counter in accordance with one embodiment.

For example, FIG. 14A illustrates an exemplary PEBS enable model specific register (MSR) 1400 in which bits 0-3 are associated with four general purpose counters, GPctr0-GPctr3, and bits 32-34 are associated with fixed function performance counters, FxCtr0-FxCtr2, respectively. In one embodiment, a bit value of 1 in any one of the bit positions 0-3 enables the corresponding general purpose counter for (N)PEBS and a value of 1 in any of the bit positions 32-34 enables the corresponding fixed function counter for (N)PEBS. Of course, the particular bit used for enabling (N)PEBS is not pertinent to the underlying principles of the invention. For example, in an alternative implementation, a bit value of 0 may be used to indicate that the corresponding counter is enabled for (N)PEBS.

In one embodiment, the programming of the ES controls 1350a-c causes a performance counter 1360a-c corresponding to the programmed ES control to track occurrences of the particular programmed non-precise/precise event. In some embodiments, any event that is not defined as a precise event is considered a non-precise event. In one embodiment, the ES control 1350a-c is programmed by an executing application. In another embodiment, a user may program the ES control 1350a-c with the non-precise/precise event identifier.

When the ES control 1350a-c is programmed with an event identifier, the performance counter 1360a-c corresponding to the ES control 1350a-c is incremented or decremented upon each occurrence of the programmed event. The PEBS enable control 1370a-c corresponding to the ES control 1350a-c and the fixed function performance counter 1360a-c may be set (e.g., activated, flag set, bit set to 1, etc) to generate a PEBS record upon overflow of the fixed function performance counter 1360a-c or, if the counter is decremented, upon the fixed function performance counter 1360a-c reaching a value of 0. In one embodiment, the PEBS enable bits illustrated in FIG. 14A are set to enable the PEBS handler 808 to generate a PEBS record upon overflow or zero value of the fixed function performance counter 1360a-c that is counting the event. As discussed above, a PEBS record includes an architectural metadata of a state of the system upon the overflow or zero value of the fixed function performance counter 1360a-c. The architectural metadata may include, but is not limited to, an IP, TSC, or register state, for example.

Figure 14B:
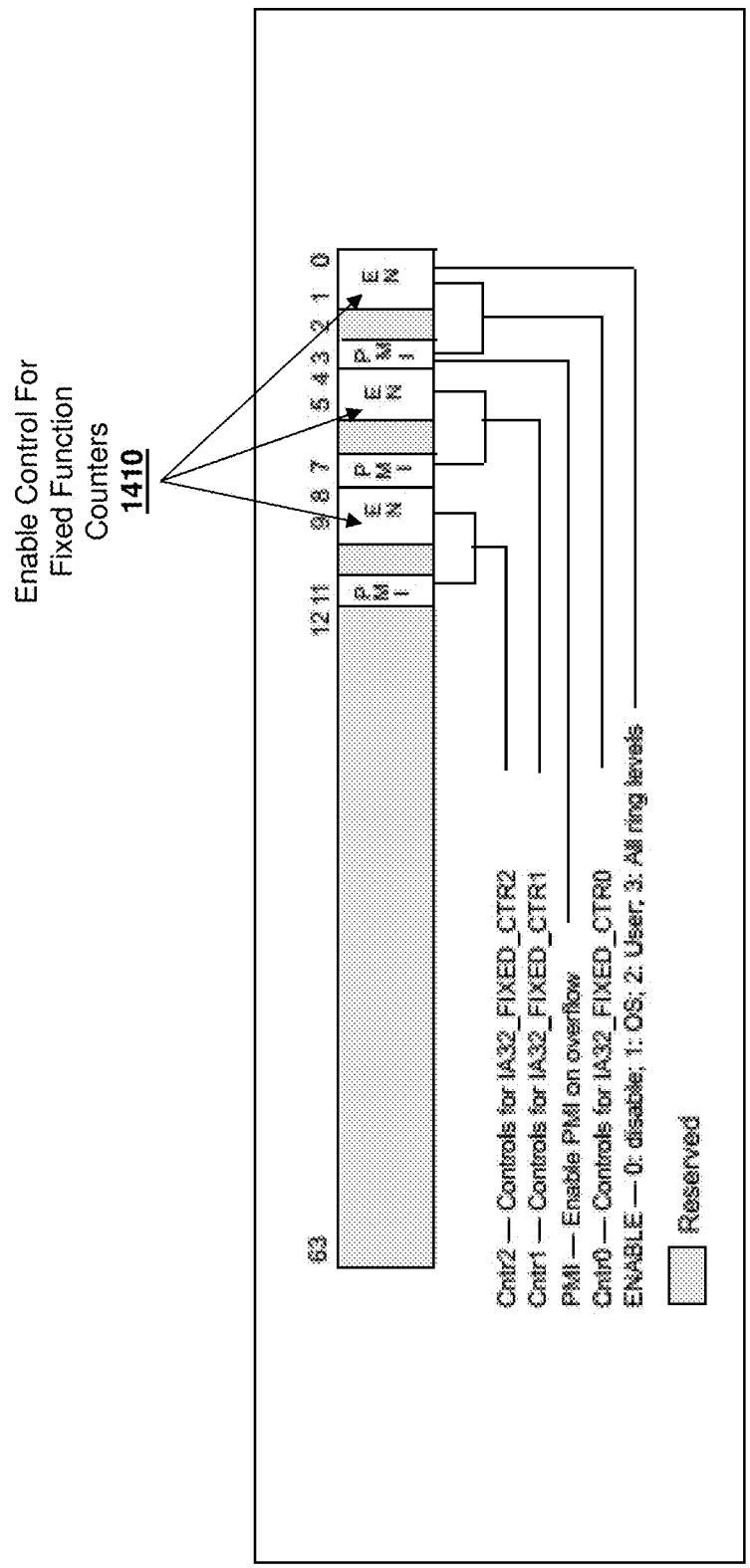

FIG. 14B illustrates an alternative MSR layout used for ES controls for fixed counters. In this embodiment, the layout of event select control 1350a-c may be implemented in a combined MSR as shown in FIG. 14B. Because they are fixed counters, there are no events to be programmed and there may not even be different MSRs for each counter (i.e., as each counter always counts only one thing there is no event select or unit mask). The PEBS enable control 1410 is shown for three fixed counters (IA32_FIXED_CTR0, IA32_FIXED_CTR1, and IA32_FIXED_CTR2). In one embodiment, the ENABLE is a 2 bit value associated with each counter which may be set to values of 0 (disable), 1 (OS control), 2 (User control), and 3 (control at all ring levels). In this embodiment, there is limited control associated with each counter due to some of the other logic required to be programmed (such as a ring level mask and PMI enable).

In one embodiment, the NPEBS module 806 is coupled to the PEBS enable control 1370a-c such that when the fixed function performance counter 1360a-c overflows or reaches a zero value, the NPEBS module 806 causes the PEBS enable control 1370a-c to generate the PEBS record for the event. In some embodiments, the NPEBS module 806 controls timing of generation of the PEBS record for the event. For example, in one embodiment, the NPEBS module 806 may cause the PEBS enable control 1370a-c to generate the PEBS record for the event immediately upon occurrence of the overflow or zero value of the performance counter 1360a-c, tracking and counting the programmed event.

In another embodiment, the NPEBS module 806 may cause the PEBS enable control 1370a-c to generate the PEBS record for the event immediately after the occurrence of the overflow or zero value of the fixed function performance counter 1360a-c, tracking and counting the programmed event. In this embodiment, the PEBS record is generated after the next instruction that retires (i.e., after completion of the next instruction in the instruction trace that triggered the fixed function performance counter 1360a-c to overflow or run to zero). In one embodiment, the PEBS record generated for the event by PEBS handler 808 is stored in memory storage 810 of the PEBS handler 808. Accordingly, the architectural meta-data associated with the event may be captured without utilizing a PMI.

In one embodiment, the PMI component 812 may function to collect the PEBS records stored in the memory storage(s) 810a-810n of PEBS handler 808. The PMI component 812 may immediately collect the PEBS records stored in the memory storage 810a-810n. In another embodiment, the PMI component 812 may be delayed in collecting the PEBS records in memory storage 810a-810n at once. The interface may be provided as a model specific register (MSR).

Applying PEBS/NPEBS/PDIR to the fixed function counters 1360a-c provides similar benefits as adding those features to the general purpose counters 816a-n, but allows for the freedom to use the general purpose counters for other activities. These and other benefits and additional features of the embodiments of the invention are discussed below.

In particular, using the techniques described herein, PEBS samples are not inhibited when interrupts are masked. In current implementations, fixed events can only pend a PMI instead of logging a PEBS. Unless the PMI is configured to cause a Non-Maskable Interrupt (NMI), the PMI will be blocked while interrupts are masked which obscures where the sample actually occurred. Use of NMIs can cause issues with stability and security on the system and are not allowed by all operating systems. Placing details of an event in the PEBS buffer is not inhibited when interrupts are masked. Interrupts are masked in interrupt handlers, context switches, locking algorithms and other critical regions within privileged code (ring0). The amount of time required for interrupt handling has increased with the switch towards SoC (System on a Chip) which requires interrupts for interactions between the CPU and other chip units. Today many event based sampling profiles are incorrect because the performance monitoring interrupt handler cannot enter when interrupts are masked to capture profiling critical data such as the instruction pointer.

These embodiments also provide for faster detection. For example, the hardware buffer can be captured to take the instruction pointer (along with additional information on the architectural state) with less latency than is required for the interrupt handler to enter upon a performance monitoring interrupt from the APIC. This leads to more accurate profiling information.

These embodiments also provide lower overhead on sampling. Multiple (N)PEBS samples and buffers can be collected upon a single performance monitoring interrupt to decrease the number of interrupts per sample collected. As mentioned, interrupts are expensive and are responsible for the majority of the performance perturbation caused by event based sampling.

For the "Instructions Retired" fixed event, extending PEBS to cover the fixed counter 1360 will allow further enhancements to utilize features such as precise distribution of instructions retired (PDIR). This feature ensures that the sampling of IPs captured in the PEBS record is statistically accurate and is available today only on a general counter 816. The general counter is often multiplexed in order to collect all requested events, which implies partial instructions profiles. This issue is resolved using embodiments of the invention where PDIR is supported on a fixed counter 1360.

Moreover, in current implementations, there is no way to have a fixed event utilize the triggering mechanism or buffer of a PEBS event. The lack of capability to accurately profile when interrupts are masked causes significant wasted time debugging platform issues.

Figure 15:
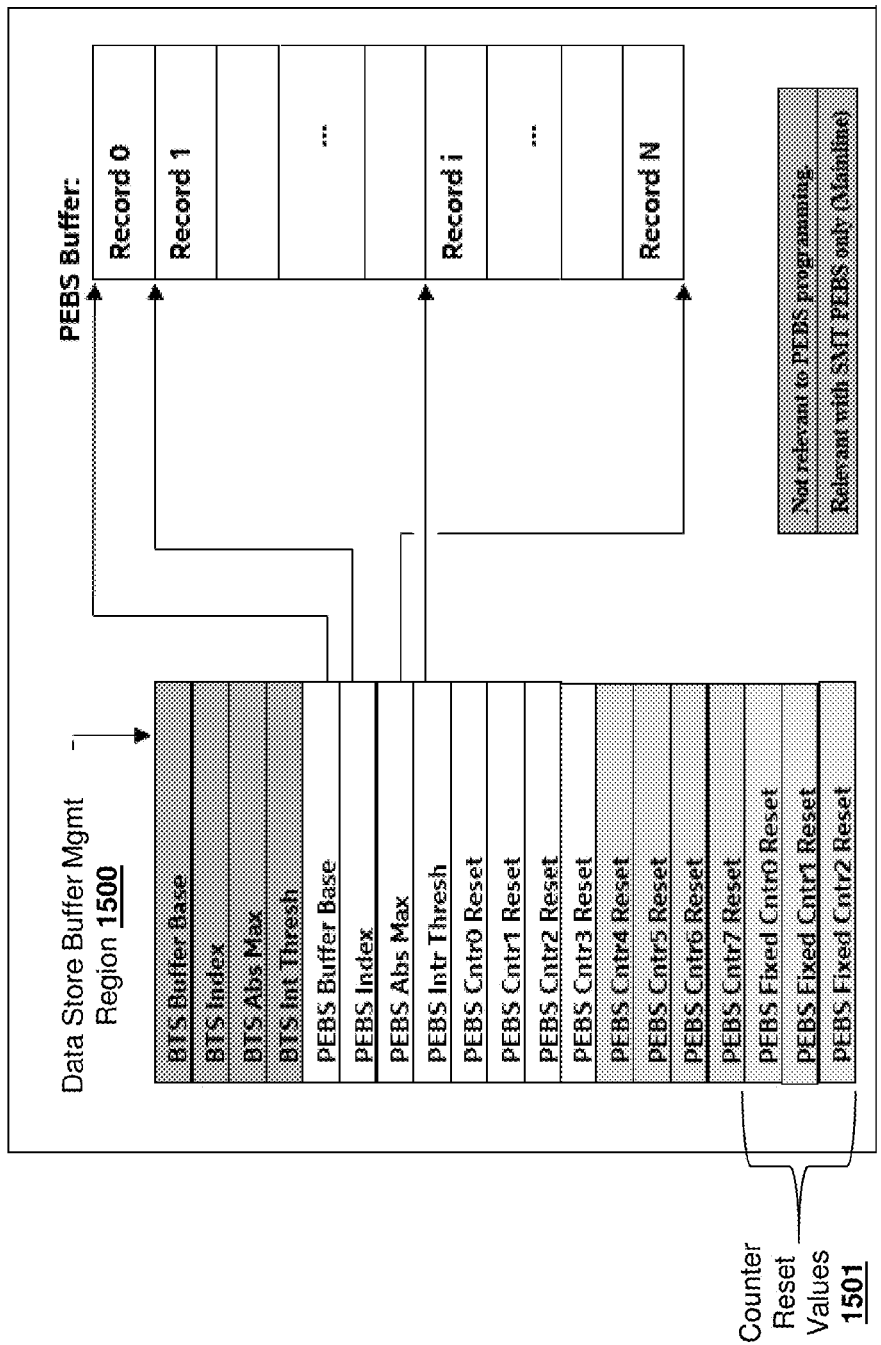
FIG. 15 illustrates updates to a data store buffer management region in accordance with one embodiment.

FIG. 15 illustrates additional details of one embodiment of the invention in which the data store buffer management region 1500 is extended to include counter reset values 1501 for all fixed counters 1360a-c (identified as Fixed Cntr0, Fixed Cntr1 and Fixed Cntr2). As mentioned above, to sample every "$n^{th}$" event, a reset value of "$-n$" may be specified by these values and programmed into the fixed counter as well as into a memory-based control block location associated with the counter. When the counter reaches 0, and after a slight pipeline delay (in which additional events may occur), the next event causes a sample to be taken. Afterward, the counter may be reset again with "$-n$" from the counter reset values 1501 (as execution and counting continue).

In summary, the embodiments of the invention provide for the extension of the PEBS enable machine specific register 1400 (e.g., IA32_PEBS_ENABLE MSR), the data store buffer management region 1500, and associated hardware control registers to include states bits in for the fixed counters 1360a-c. These embodiments allow all fixed events to set the corresponding PEBS_ENABLE bit so that they can utilize the PEBS triggering mechanism and buffer when they have hit the input sample after value, either using PEBS or NPEBS as described above. For reference and core clocks, the fixed events are not guaranteed to tag to any particular instruction but will allow the clock events to utilize the PEBS buffer to store all information already available through PEBS on that architecture such as Instruction Pointer (RIP/EIP), timestamp counter (TSC) and general purpose registers. In addition, in one embodiment, hardware in the exception generation logic takes the additional inputs and appropriately inserts the PEBS assist operations. In one embodiment, the fixed counter 1360 utilizes the PEBS triggering mechanism. Consequently, fixed events can program the PEBS enable machine specific register 1400 and enable PEBS for those non-precise events.

FIG. 16A illustrates sampling without PEBS and where PMIs are not mapped to NMIs. The end result us an inaccurate profile where the entire profile may be missed and samples may be dropped. In contrast, FIG. 16B illustrates event based sampling on fixed events utilizing PEBS sampling techniques as described herein. The result is significantly greater accuracy and sample collection upon the occurrence of events.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processing device, comprising:
   a fixed function performance counter to decrement or increment upon occurrence of an event in the processing device;
   a precise event based sampling (PEBS) enable control communicably coupled to the fixed function performance counter; and
   a PEBS handler to generate and store a PEBS record comprising architectural metadata defining a state of the processing device at a time of generation of the PEBS record.

2. The processing device of claim 1 further comprises an enable control communicably coupled to the fixed function performance counter to enable or disable operation of the fixed function performance counter.

3. The processing device of claim 1 wherein the event is a performance event that is not associated with an instruction in an instruction trace, wherein the event occurs when the instruction does not retire.

4. The processing device of claim 1 wherein the PEBS record for the event is generated when the PEBS enable control is set for the fixed function performance counter.

5. The processing device of claim 1 further comprising a non-precise event based sampling (NPEBS) module communicably coupled to the PEBS enable control and the PEBS handler, the NPEBS module to cause the PEBS handler to generate the PEBS record for the event upon the fixed function performance counter reaching a specified value wherein the NPEBS module is further to cause the PEBS handler to generate the PEBS record for the event immediately upon occurrence of the fixed function performance counter reaching the specified value.

6. The processing device of claim 1 further comprising a non-precise event based sampling (NPEBS) module communicably coupled to the PEBS enable control and the PEBS handler, the NPEBS module to cause the PEBS handler to generate the PEBS record for the event upon the fixed function performance counter reaching a specified value wherein the NPEBS module further to cause the PEBS handler to generate the PEBS record for the event immediately after occurrence of the fixed function performance counter reaching the specified value.

7. The processing device of claim 1, wherein the PEBS handler comprises a memory storage to store the PEBS record generated for the event.

8. The processing device of claim 7 wherein the event is generated without enabling a performance monitoring unit (PMI).

9. The processing device as in claim 1 wherein the specified value comprises a zero value if the fixed function performance counter is decremented or an overflow value if the fixed function performance counter is incremented.

10. The processing device as in claim 1 wherein the event comprises a non-precise event.

11. A system comprising:
    a memory; and
    a processing device communicably coupled to the memory, wherein the processing device comprises:
    a fixed function performance counter to decrement or increment upon occurrence of an event in the processing device;
    a precise event based sampling (PEBS) enable control communicably coupled to the fixed function performance counter; and
    a PEBS handler to generate and store a PEBS record comprising architectural metadata defining a state of the processing device at a time of generation of the PEBS record.

12. The system of claim 11 wherein the processing device further comprises an enable control communicably coupled to the fixed function performance counter to enable or disable operation of the fixed function performance counter.

13. The system of claim 11 wherein the event is a performance event that is not associated with an instruction in an instruction trace, wherein the event occurs when the instruction does not retire.

14. The system of claim 11 wherein the PEBS record for the event is generated when the PEBS enable control is set for the fixed function performance counter.

15. The system as in claim 11 wherein the specified value comprises a zero value if the fixed function performance counter is decremented or an overflow value if the fixed function performance counter is incremented.

16. The system as in claim 11 wherein the event comprises a non-precise event.

17. A method comprising:
    incrementing a value in a fixed function performance counter upon occurrence of an non-precise event generated in a processing device; and
    causing a precise event based sampling (PEBS) handler to generate and store a PEBS record for the non-precise event upon overflow of the performance counter, wherein the PEBS record comprises an architectural metadata defining a state of the processing device at a time of generation of the PEBS record.

18. The method of claim 17 further comprising programming an enable control communicably coupled to the fixed function performance counter to enable or disable operation of the fixed function performance counter.

19. The method of claim 17 wherein the non-precise event is a performance event that is not associated with an instruction in an instruction trace, wherein the non-precise event occurs when the instruction does not retire.

20. The method of claim 17 wherein the PEBS record for the non-precise event is generated when a PEBS enable control is set for the performance counter, wherein the PEBS enable control is communicably coupled to the performance counter.

21. A non-transitory machine-readable storage medium including data that, when accessed by a processing device, cause the processing device to perform operations comprising:

incrementing a value in a fixed function performance counter upon occurrence of a non-precise event generated in a processing device; and causing a precise event based sampling (PEBS) handler to generate and store a PEBS record for the non-precise event upon overflow of the performance counter, wherein the PEBS record comprises an architectural metadata defining a state of the processing device at a time of generation of the PEBS record.

22. The non-transitory machine-readable storage medium of claim 21 wherein the operations further comprise programming an enable control communicably coupled to the fixed function performance counter to enable or disable operation of the fixed function performance counter.

23. The non-transitory machine-readable storage medium of claim 21 wherein the non-precise event is a performance event that is not associated with an instruction in an instruction trace, wherein the non-precise event occurs when the instruction does not retire.

24. The non-transitory machine-readable storage medium of claim 21 wherein the PEBS record for the non-precise event is generated when a PEBS enable control is set for the performance counter, wherein the PEBS enable control is communicably coupled to the performance counter.

* * * * *